US 7,858,166 B2

(12) United States Patent
Nakai et al.

(10) Patent No.: US 7,858,166 B2
(45) Date of Patent: *Dec. 28, 2010

(54) PHASE CHANGE RECORDING MEDIUM

(75) Inventors: Tsukasa Nakai, Hino (JP); Noritake Oomachi, Yokohama (JP); Sumio Ashida, Yokohama (JP); Naomasa Nakamura, Yokohama (JP); Keiichiro Yusu, Yokohama (JP); Yasuhiro Satoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 814 days.

This patent is subject to a terminal disclaimer.

(21) Appl. No.: 11/669,406

(22) Filed: Jan. 31, 2007

(65) Prior Publication Data

US 2007/0178272 A1 Aug. 2, 2007

(30) Foreign Application Priority Data

Feb. 2, 2006 (JP) .............................. 2006-025789

(51) Int. Cl.
B32B 3/02 (2006.01)

(52) U.S. Cl. .................... 428/64.1; 428/64.4; 428/64.5; 428/64.6; 430/270.13

(58) Field of Classification Search ........................ None
See application file for complete search history.

(56) References Cited

U.S. PATENT DOCUMENTS

| | | | |
|---|---|---|---|
| 5,294,523 | A | 3/1994 | Nagata et al. |
| 5,818,808 | A | 10/1998 | Takada et al. |
| 6,030,679 | A | 2/2000 | Saito et al. |
| 6,103,330 | A | 8/2000 | Kosuda et al. |
| 6,607,869 | B1 | 8/2003 | Kojima et al. |
| 6,944,116 | B2 * | 9/2005 | Nakamura et al. .......... 369/283 |
| 7,110,348 | B2 * | 9/2006 | Nakamura et al. .......... 369/283 |
| 7,132,147 | B2 * | 11/2006 | Nakai et al. ................. 428/64.1 |
| 7,214,416 | B2 * | 5/2007 | Nakai et al. ................. 428/64.4 |
| 7,291,375 | B2 * | 11/2007 | Nakai et al. ................. 428/64.4 |
| 7,294,382 | B2 * | 11/2007 | Nakai et al. ................. 428/64.4 |
| 7,335,459 | B2 * | 2/2008 | Ashida et al. .......... 430/270.13 |
| 7,357,969 | B2 * | 4/2008 | Nakai et al. ................. 428/64.1 |

(Continued)

FOREIGN PATENT DOCUMENTS

CN 1445768 A 10/2003

(Continued)

OTHER PUBLICATIONS

Rie Kojima, et al., "Ge-Sn-Sb-Te Phase-change Recording Material Having High Crystallization Speed", Proceedings of PCOS2000, Nov. 30-Dec. 1, 2000, pp. 36-41.

(Continued)

Primary Examiner—Elizabeth Mulvaney
(74) Attorney, Agent, or Firm—Oblon, Spivak, McClelland, Maier & Neustadt, L.L.P.

(57) ABSTRACT

According to one embodiment, in a phase change optical disk which has a substrate and a multi-layered including an interference film, phase change recording film, interface film, and reflecting film, and in which information is reversibly recorded in or erased from the recording film by using light, an element (e.g., Ge or Te) forming the phase change recording film has segregation or a concentration distribution in the thickness direction of the recording film from a portion in contact with the phase change recording film.

16 Claims, 14 Drawing Sheets

U.S. PATENT DOCUMENTS

| | | |
|---|---|---|
| 7,455,951 B2 | 11/2008 | Ichihara et al. |
| 7,510,753 B2* | 3/2009 | Nakai et al. ................ 428/64.4 |
| 2003/0099185 A1* | 5/2003 | Nakamura et al. ....... 369/275.2 |
| 2004/0121261 A1* | 6/2004 | Ashida et al. .......... 430/270.13 |
| 2005/0025035 A1* | 2/2005 | Nakai et al. .............. 369/275.2 |
| 2005/0074694 A1* | 4/2005 | Nishihara et al. ...... 430/270.13 |
| 2005/0089799 A1* | 4/2005 | Otoba et al. ........... 430/270.11 |
| 2005/0106353 A1* | 5/2005 | Nakai et al. ................ 428/64.4 |
| 2005/0112499 A1* | 5/2005 | Nakai et al. ............ 430/270.13 |
| 2005/0227035 A1 | 10/2005 | Fuchioka et al. |
| 2006/0007846 A1* | 1/2006 | Nakamura et al. ....... 369/275.1 |
| 2006/0077869 A1 | 4/2006 | Yusu et al. |
| 2006/0077878 A1 | 4/2006 | Nakai et al. |
| 2006/0146687 A1* | 7/2006 | Nakai et al. ............. 369/275.2 |
| 2006/0234005 A1* | 10/2006 | Nakai et al. ................ 428/64.4 |
| 2006/0269719 A1* | 11/2006 | Nakai et al. ................ 428/64.4 |
| 2006/0291370 A1 | 12/2006 | Nakai et al. |
| 2007/0248785 A1 | 10/2007 | Nakai et al. |

FOREIGN PATENT DOCUMENTS

| | | |
|---|---|---|
| JP | 58-161161 | 9/1983 |
| JP | 6-195747 | 7/1994 |
| JP | 2556183 | 9/1996 |
| JP | 2674837 | 7/1997 |
| JP | 10-334515 | 12/1998 |
| JP | 11-213446 | 8/1999 |
| JP | 11-265521 | 9/1999 |
| JP | 11-321094 | 11/1999 |
| JP | 2000-103165 | 4/2000 |
| JP | 2000-322770 | 11/2000 |
| JP | 2001-232941 | 8/2001 |
| JP | 2003-6794 | 1/2003 |
| JP | 2003-323743 | 11/2003 |
| JP | 3550317 | 4/2004 |
| TW | 200517383 | 6/2005 |
| WO | WO 02/31825 | 4/2002 |

OTHER PUBLICATIONS

S. K. Bahl, et al., "Amorphous versus Crystalline GeTe Films", Journal of Applied Physics vol. 41, No. 5, Apr. 1970, pp. 2196-2212.

S. Ogawa, et al., "Optical and Electrical Properties and Electronic Structure of Ge2Sb2Te5", Proceeding of PCOS1997, pp. 50-53.

M. Kuwahara, et al., "thermal Original of Readout Mechanism on Super Resolution Near-Field Structure Disk—Appearance of super resolutional readout by thermal effect," Technical Report of IEICE, the Institute of Electronics, Information and Communication Engineers, Mar. 2004, Chapter 3.1.

J. Tominaga et al., "Principle of Super Lens and the Progress," Technical Report of IEICE, the Institute of Electronics, Information and Communication Engineers. Sep. 1999, Fig 3.3.

* cited by examiner

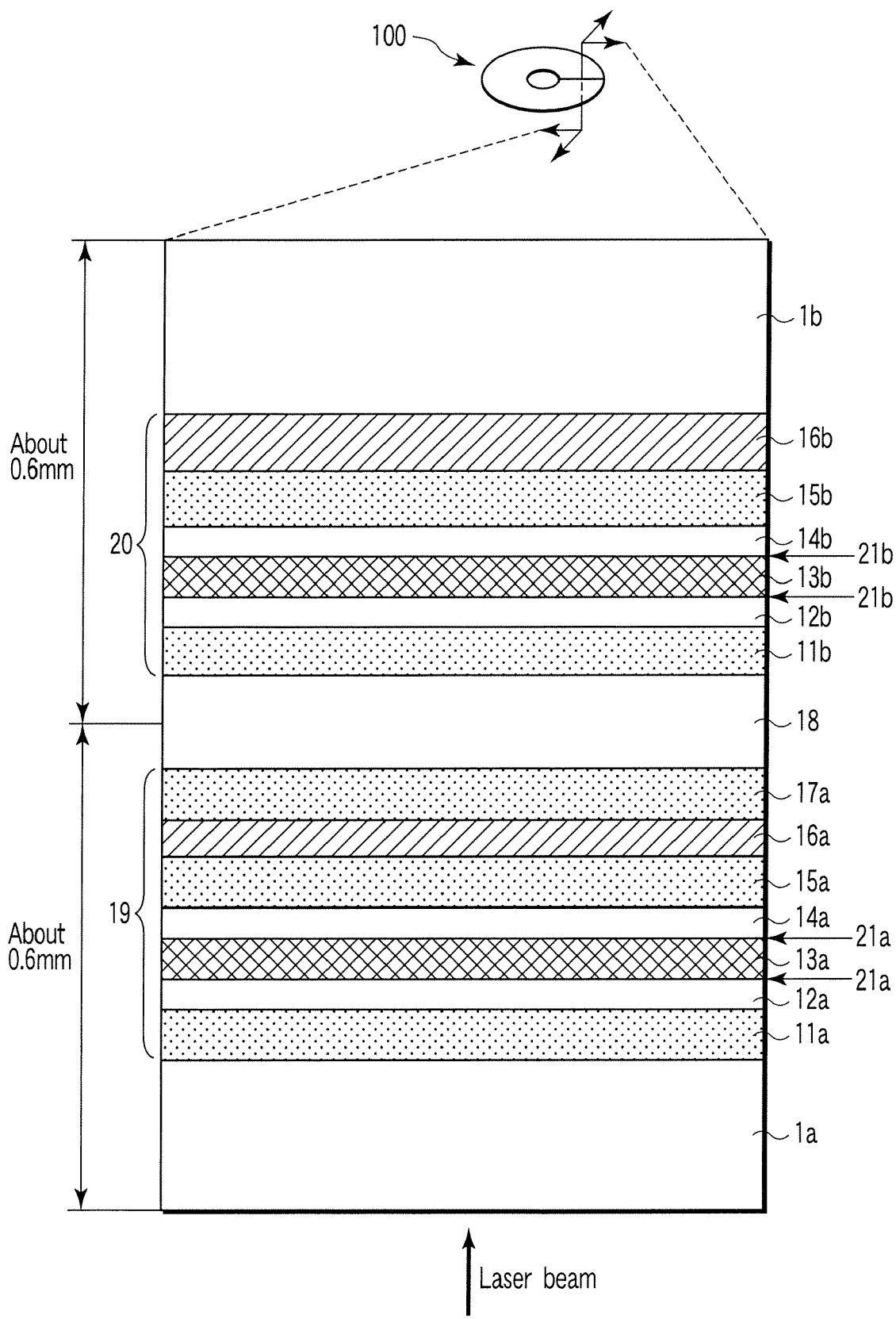
F I G. 1

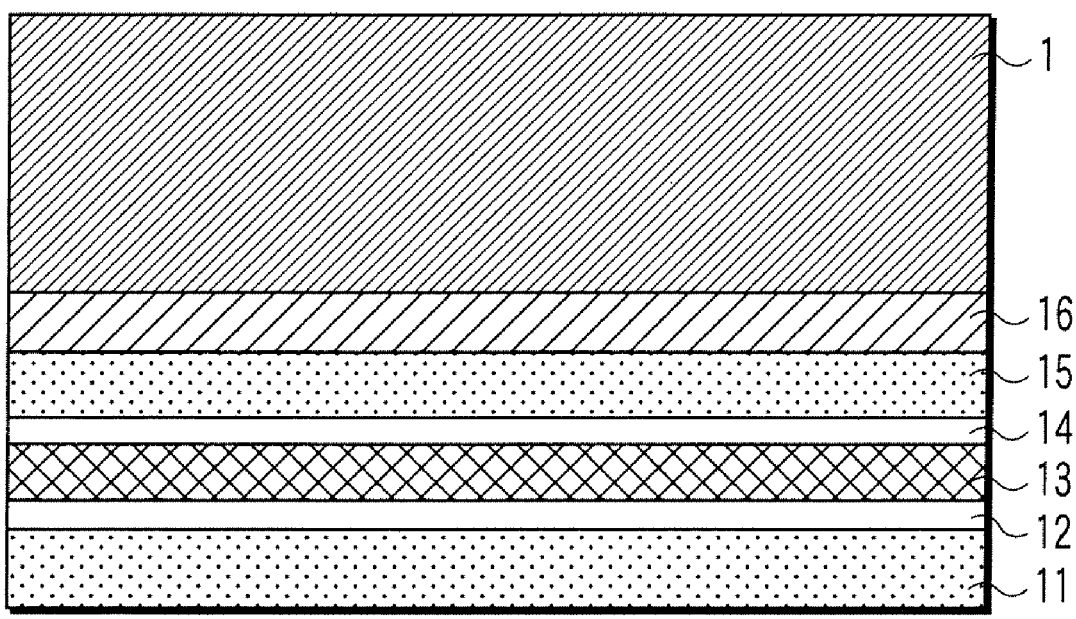
F I G. 2

| No. | Interface layer (upper interface film and/or lower interface film) |
|---|---|
| 1 | GeN |
| 2 | GeCrN |
| 3 | $ZrO_2 + Y_2O_3$ |
| 4 | $ZrO_2 + Y_2O_3 + Cr_2O_3$ |
| 5 | $ZrO_2 + Y_2O_3 + SiO_2 + Cr_2O_3$ |
| 6 | $ZrSiO_4 + Cr_2O_3$ |
| 7 | $HfO_2$ |
| 8 | $(ZrO_{2-x}N_x)_{1-y}((Y_2O_3)_{1-z}(Nb_2O_5)_z)_y$ |
| 9 | $HfO_{2-x}N_x (0.1 \leq x \leq 0.2)$ |
| 10 | $Cr_2O_3$ |
| 11 | $ZnO + Ta_2O_5$ |
| 12 | $ZnO + Ta_2O_3 + In_2O_3$ |
| 13 | $SnO_2 + Sb_2O_3$ |
| 14 | $SnO_2 + Ta_2O_5$ |
| 15 | $SnO_2 + Nb_2O_5$ |

Favorable composition ranges of $(ZrO_{2-x}N_x)_{1-y}((Y_2O_3)_{1-z}(Nb_2O_5)_z)_y$ are $0 < x \leq 0.2$, $0 < y \leq 0.1$, and $0 \leq z \leq 1$, and favorable composition range of $HfO_{2-x}N_x$ is $0.1 \leq x \leq 0.2$

FIG. 6

Composition ratio of $Ge_xN_x$ [at.%]

| No. | Ge | N |
|---|---|---|
| 1 | 54 | 46 |
| 2 | 52 | 48 |
| 3 | 50 | 50 |
| 4 | 48 | 52 |
| 5 | 47 | 53 |

FIG. 7

Compositions of recording films

| No. | Composition of recording film |
|---|---|
| 1 | $Ge_{10}Sb_2Te_{13}$ |
| 2 | $Ge_4Sb_2Te_7$ |
| 3 | $Ge_8Sb_2Te_{13}Bi_2$ |
| 4 | $Ge_3Sb_2Te_7Bi$ |
| 5 | $Ge_6Sb_2Te_{13}Sn_4$ |
| 6 | $Ge_3Sb_2Te_7Sn$ |
| 7 | $Ge_{10}Bi_2Te_{13}$ |
| 8 | $Ge_{2.9}BiTe_{4.4}$ |
| 9 | $Ge_{11.25}BiTe_{12.75}$ |
| 10 | $Ge_{10}Sb_{1.5}In_{0.5}Te_{13}$ |
| 11 | $Ge_{10}Bi_{1.5}In_{0.5}Te_{13}$ |
| 12 | $Ge_4Sb_{1.5}In_{0.5}Te_7$ |
| 13 | $Ge_{2.9}Bi_{0.75}In_{0.25}Te_{4.4}$ |
| 14 | $Ge_{10}Sb_{1.2}In_{0.8}Te_{13}$ |

FIG. 8

Comparative examples

| No. | Interface layer |
|---|---|
| Comparative Example 1 | None |
| Comparative Example 2 | $SiO_2$ |
| Comparative Example 3 | $Y_2O_3$ |

FIG. 9

Measurement of DOS for valance band

| No. | Interface layer 1 | Interface layer 2 | State density ratio ※ |
|---|---|---|---|
| 1 | $ZrO_2+Y_2O_3$ | $ZnO+Ta_2O_5$ | 1.1 |
| 2 | GeCrN | $Cr_2O_3$ | 1.2 |
| 3 | $ZrO_2+Y_2O_3+Cr_2O_3$ | $SnO_2+Sb_2O_3$ | 2.3 |
| 4 | $ZrSiO_4+Cr_2O_3$ | $Cr_2O_3$ | 1.4 |
| 5 | $ZrO_2+Y_2O_3+SiO_2+Cr_2O_3$ | $ZnO+Ta_2O_3+In_2O_3$ | 2.5 |
| 6 | $(ZrO_{2-x}N_x)_{1-y}((Y_2O_3)_{1-z}(Nb_2O_5)z)y$ | $SnO_2+Nb_2O_5$ | 1.6 |
| 7 | $HfO_{2-x}N_x (0.1 \leqq x \leqq 0.2)$ | GeN | 1.4 |
| 8 | GeN | $Cr_2O_3$ | 1.1 |
| 9 | $HfO_{2-x}N_x (0.1 \leqq x \leqq 0.2)$ | $ZrSiO_4+Cr_2O_3$ | 1.9 |
| 10 | $Cr_2O_3$ | $ZnO+Ta_2O_5$ | 2.2 |
| 11 | GeN | $SnO_2+Ta_2O_5$ | 1.1 |
| 12 | $ZrO_2+Y_2O_3+Cr_2O_3$ | $ZnO+Ta_2O_3+In_2O_3$ | 2.4 |

FIG. 10

Measurement of DOS for valance band

| No. | Interface layer 1 | Interface layer 2 | State density ratio ※ |
|---|---|---|---|
| Comparative example 1 | None | None | 7 |
| Comparative example 2 | $SiO_2$ | $SiO_2$ | 4 |
| Comparative example 3 | $Y_2O_3$ | $Y_2O_3$ | 5 |

FIG. 11

Standard evaluation conditions

| Item | Condition |
|---|---|
| Wavelength [nm] | 405 |
| N.A. | 0.65 |
| Track Pitch [μm] (Land&Grove) | 0.34 |
| Linear velocity [m/sec] (constant velocity) ※ | 5.4 |

※ Double velocity was 10.8 [m/sec], and fourfold velocity was 21.6 [m/sec]

F I G. 12

Disk characteristic measurements

| Example | CNR [dB] | SbER (v=5.6 [m/sec]) | CNR [dB] | SbER (v=4.4 [m/sec]) |
|---|---|---|---|---|
| Example 2 | 52.9 | $1.8 \times 10^{-6}$ | 33.8 | $3.2 \times 10^{-5}$ |
| Example 3 | 52.6 | $1.5 \times 10^{-6}$ | 33.1 | $4.2 \times 10^{-5}$ |
| Example 4 | 52.8 | $1.6 \times 10^{-6}$ | 33.1 | $3.8 \times 10^{-5}$ |
| Example 5 | 53.7 | $1.9 \times 10^{-6}$ | 34.8 | $3.1 \times 10^{-5}$ |
| Example 6 | 53.6 | $2.2 \times 10^{-6}$ | 34.9 | $3.9 \times 10^{-5}$ |
| Example 7 | 53.7 | $1.8 \times 10^{-6}$ | 34.8 | $2.4 \times 10^{-5}$ |
| Example 8 | 52.0 | $2.6 \times 10^{-6}$ | 30.9 | $3.2 \times 10^{-5}$ |
| Example 9 | 53.2 | $1.9 \times 10^{-6}$ | 34.6 | $3.4 \times 10^{-5}$ |
| Example 10 | 53.6 | $2.2 \times 10^{-6}$ | 34.7 | $4.2 \times 10^{-5}$ |
| Example 11 | 51.9 | $2.6 \times 10^{-6}$ | 31.3 | $3.4 \times 10^{-5}$ |
| Example 12 | 53.8 | $2.0 \times 10^{-6}$ | 34.8 | $3.9 \times 10^{-5}$ |
| Example 13 | 53.7 | $1.9 \times 10^{-6}$ | 34.9 | $3.5 \times 10^{-5}$ |
| Example 14 | 53.1 | $1.4 \times 10^{-6}$ | 34.9 | $2.9 \times 10^{-5}$ |
| Example 15 | 51.9 | $1.5 \times 10^{-6}$ | 34.6 | $2.9 \times 10^{-5}$ |

F I G. 13

High-speed recording/erase characteristics

| Sample No. | ER[dB] | | |
|---|---|---|---|
| | Constant velocity | Double velocity | Fourfold velocity |
| Example 2 | 34.9 | 34.1 | 32 |
| Example 3 | 30.1 | 30.3 | 30.3 |
| Example 4 | 34.2 | 35.2 | 34.3 |
| Example 5 | 32.8 | 32.9 | 32.2 |
| Example 6 | 36.2 | 34.5 | 33.4 |
| Example 7 | 33.2 | 32.2 | 30.3 |
| Example 8 | 33.9 | 31.7 | 30.5 |
| Example 9 | 31.3 | 30.8 | 30.1 |

FIG. 14

Recording film compositions and evaluation results

| No. | Composition of recording film | CNR[dB] | SbER |
|---|---|---|---|
| 1 | $Ge_{10}Sb_2Te_{13}$ | 52.8 | $2.2 \times 10^{-6}$ |
| 2 | $Ge_4Sb_2Te_7$ | 52.2 | $2.2 \times 10^{-6}$ |
| 3 | $Ge_8Sb_2Te_{13}Bi_2$ | 53.7 | $1.8 \times 10^{-6}$ |
| 4 | $Ge_3Sb_2Te_7Bi$ | 54.4 | $2.1 \times 10^{-6}$ |
| 5 | $Ge_6Sb_2Te_{13}Sn_4$ | 52.2 | $1.9 \times 10^{-6}$ |
| 6 | $Ge_3Sb_2Te_7Sn$ | 52.8 | $2.4 \times 10^{-6}$ |
| 7 | $Ge_{10}Bi_2Te_{13}$ | 53.6 | $2.2 \times 10^{-6}$ |
| 8 | $Ge_{2.9}BiTe_{4.4}$ | 53.1 | $2.4 \times 10^{-6}$ |
| 9 | $Ge_{11.25}BiTe_{12.75}$ | 53.6 | $2.2 \times 10^{-6}$ |
| 10 | $Ge_{10}Sb_{1.5}In_{0.5}Te_{13}$ | 55.8 | $3.4 \times 10^{-6}$ |
| 11 | $Ge_{10}Bi_{1.5}In_{0.5}Te_{13}$ | 55.6 | $2.9 \times 10^{-6}$ |
| 12 | $Ge_4Sb_{1.5}In_{0.5}Te_7$ | 54.2 | $3.6 \times 10^{-6}$ |
| 13 | $Ge_{2.9}Bi_{0.75}In_{0.25}Te_{4.4}$ | 55.1 | $2.9 \times 10^{-6}$ |
| 14 | $Ge_{10}Sb_{1.2}In_{0.8}Te_{13}$ | 53.1 | $2.2 \times 10^{-6}$ |

FIG. 15

Nitrogen-added recording film compositions and evaluation results

| No. | Composition of recording film | CNR[dB] | SbER |
|---|---|---|---|
| 1 | $Ge_{10}Sb_2Te_{13}+N(3at.\%)$ | 54.8 | $3.3\times10^{-6}$ |
| 2 | $Ge_4Sb_2Te_7+N(3at.\%)$ | 55.2 | $3.4\times10^{-6}$ |
| 3 | $Ge_4Sb_2Te_7+N(5at.\%)$ | 54.7 | $2.1\times10^{-6}$ |
| 4 | $Ge_8Sb_2Te_{13}Bi_2+N(3at.\%)$ | 55.4 | $2.3\times10^{-6}$ |
| 5 | $Ge_3Sb_2Te_7Bi+N(3at.\%)$ | 54.2 | $3.6\times10^{-6}$ |
| 6 | $Ge_{10}Bi_2Te_{13}+N(1at.\%)$ | 55.8 | $3.4\times10^{-6}$ |
| 7 | $Ge_{10}Bi_2Te_{13}+N(2.5at.\%)$ | 55.6 | $2.9\times10^{-6}$ |
| 8 | $Ge_{2.9}BiTe_{4.4}+N(1at.\%)$ | 55.1 | $2.9\times10^{-6}$ |
| 9 | $Ge_{11.25}BiTe_{12.75}+N(3at.\%)$ | 55.6 | $2.9\times10^{-6}$ |
| 10 | $Ge_{10}Sb_{1.5}In_{0.5}Te_{13}+N(1at.\%)$ | 52.8 | $2.4\times10^{-6}$ |
| 11 | $Ge_{10}Bi_{1.5}In_{0.5}Te_{13}+N(3at.\%)$ | 53.6 | $2.2\times10^{-6}$ |
| 12 | $Ge_4Sb_{1.5}In_{0.5}Te_7+N(3at.\%)$ | 52.2 | $2.2\times10^{-6}$ |
| 13 | $Ge_{2.9}Bi_{0.75}In_{0.25}Te_{4.4}+N(2.5at.\%)$ | 53.7 | $1.8\times10^{-6}$ |
| 14 | $Ge_{10}Sb_{1.2}In_{0.8}Te_{13}+N(1at.\%)$ | 52.3 | $2.5\times10^{-6}$ |

F I G. 16

Evaluation results (disk characteristics) of comparative examples

| Comparative examples | Interface layer | CNR[dB] | SbER | ER[dB] |
|---|---|---|---|---|
| Comparative example 1 | None | 49.8 | Immeasurable | 25 |
| Comparative example 2 | $SiO_2$ | 48.8 | $5.0\times10^{-4}$ | 25 |
| Comparative example 3 | $Y_2O_3$ | 50.9 | $3.3\times10^{-3}$ | 19 |

F I G. 17

Evaluation results of high-speed recording/erase characteristics of samples of comparative examples

| Comparative examples | Interface layer | ER[dB] | | |
|---|---|---|---|---|
| | | Constant velocity | Double velocity | Fourfold velocity |
| Comparative example 2 | $SiO_2$ | 28 | 22.6 | 11.3 |
| Comparative example 3 | $Y_2O_3$ | 20 | 17 | 9 |

F I G. 18

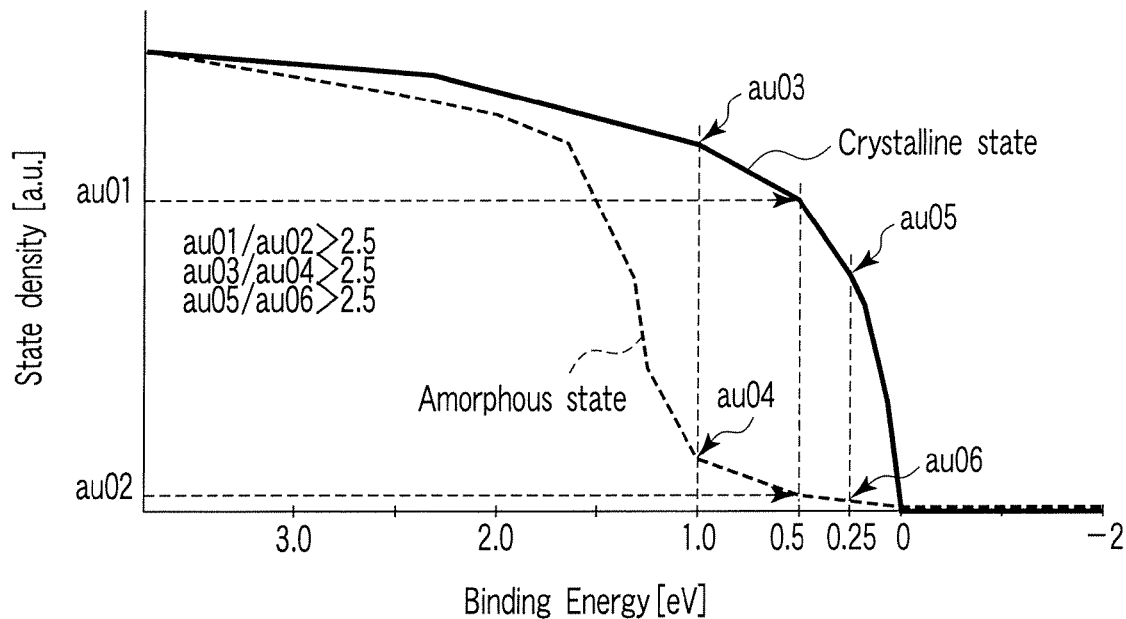
F I G. 19
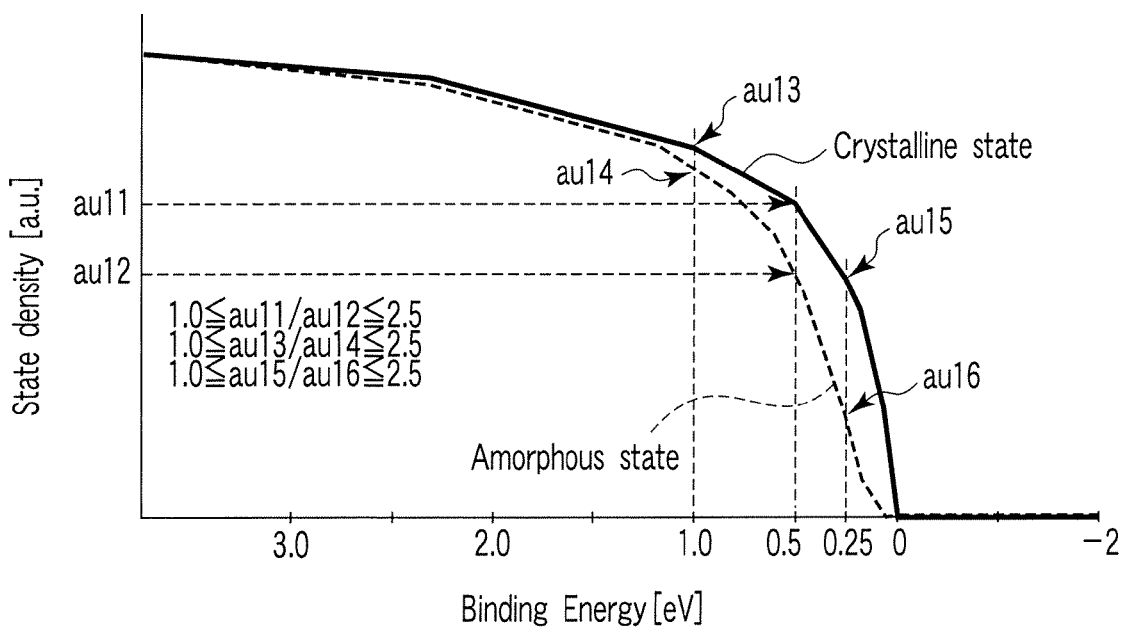
F I G. 20

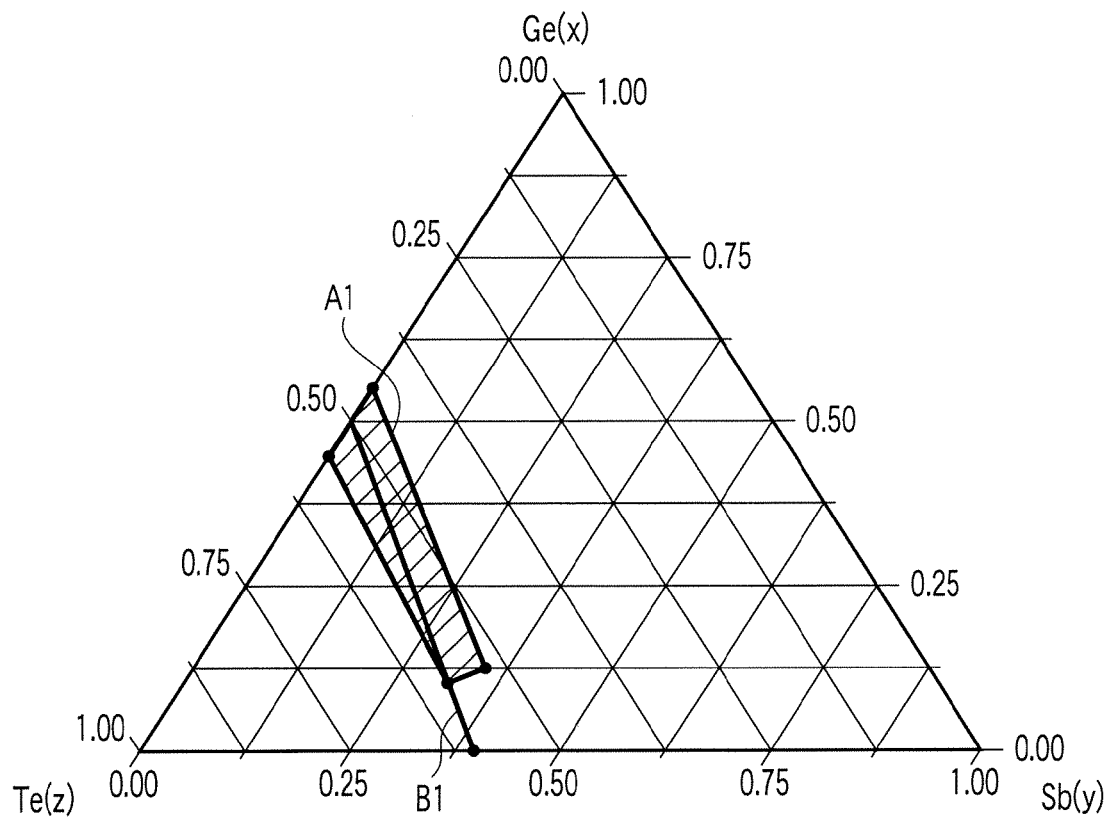
F I G. 21
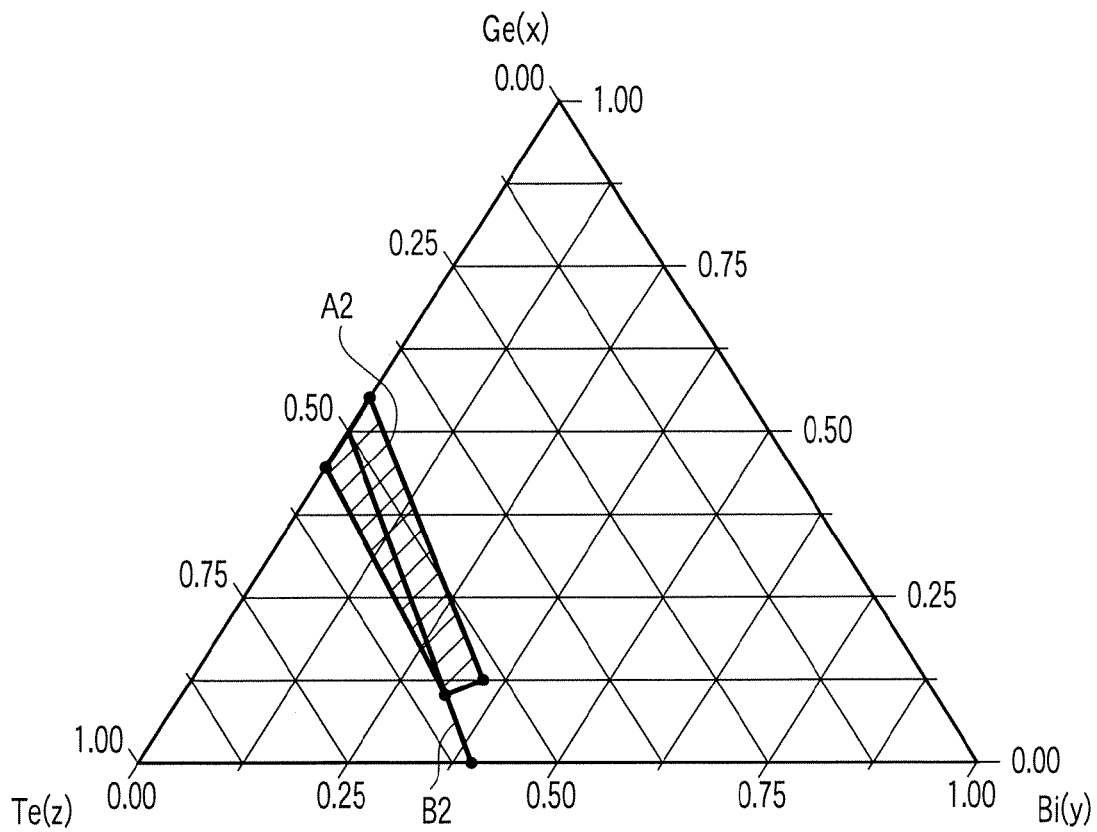
F I G. 22

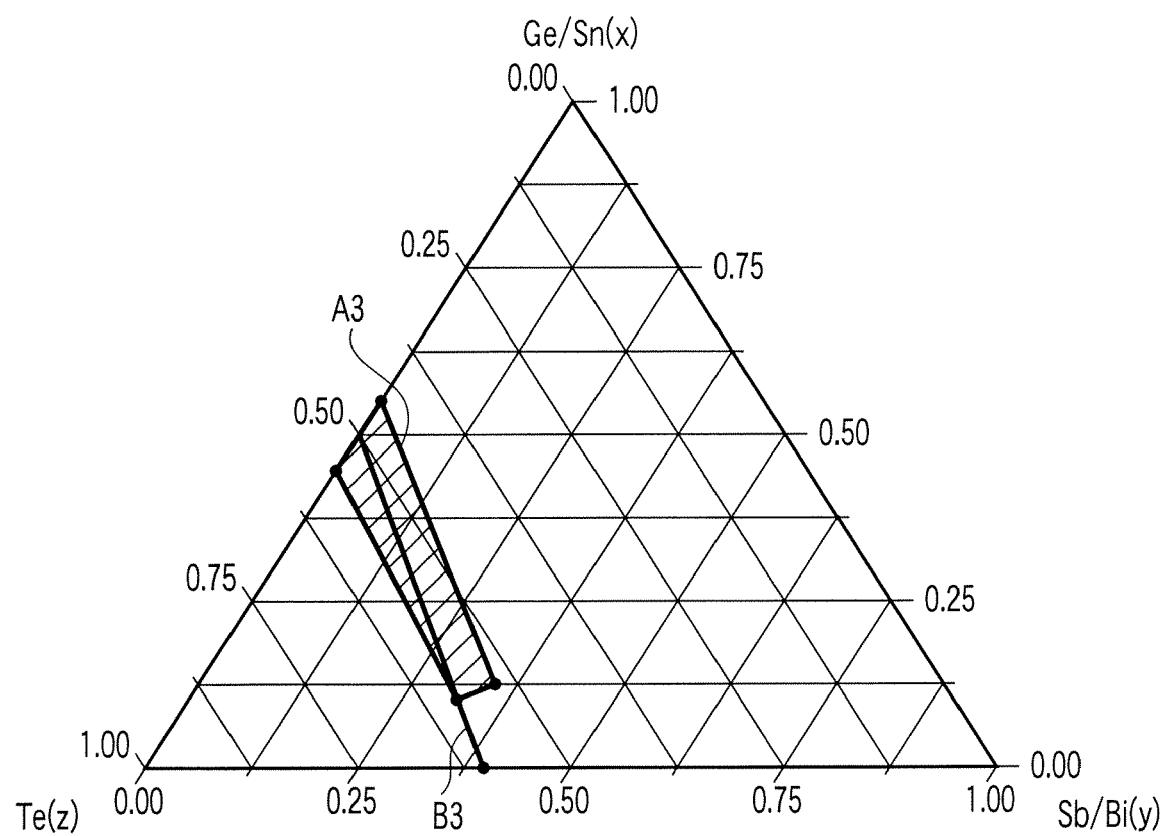
F I G. 23

PHASE CHANGE RECORDING MEDIUM

CROSS-REFERENCE TO RELATED APPLICATIONS

This application is based upon and claims the benefit of priority from Japanese Patent Application No. 2006-025789, filed Feb. 2, 2006, the entire contents of which are incorporated herein by reference.

BACKGROUND

1. Field

One embodiment of the invention relates to a phase change recording medium which records information by reversibly changing the state by irradiation with a light beam. The present invention more particularly relates to a phase change recording medium in which the atomic arrangement of a thin film for holding recorded information changes between an amorphous state and crystalline state.

2. Description of the Related Art (Phase Change Optical Recording Principle)

In a phase change optical recording film, a portion heated to the melting point or more generally melts and takes an amorphous atomic arrangement when rapidly cooled. The recent researches indicate the possibility that this amorphous atomic arrangement is not a complete amorphous state but has a short range regularity. However, XRD (X Ray Diffraction) measurements show that there is no peak which is observed if a crystal exists. Therefore, a long range regularity which is the essential characteristic of a crystalline state does not exist or is very weak. Accordingly, "a state in which a portion heated to the melting point or more takes an amorphous atomic arrangement when rapidly cooled" will be referred to as an amorphous state hereinafter as usual. Also, when a material is held for a predetermined time or more in a temperature region from the crystallization temperature to the melting point, the material remains crystalline if it is initially crystalline, but crystallizes if it is initially amorphous (a solid phase erase mode). Depending on the material of a recording film, it is also possible to crystallize an amorphous portion of a recording film by melting the portion by heating it to the melting point or more, and then gradually cooling it (a melt erase mode).

Since the intensity of reflected light from an amorphous portion differs from that of reflected light from a crystal portion, the intensity of the reflected light is converted into the intensity of an electrical signal, and information is read out by A/D converting the electrical signal. This is the principle of the phase change recording medium. It is also possible to record and read out information by using the transition between a metastable crystalline phase such as a martensite phase and a stable crystalline phase, or between plurality of metastable crystalline phases, instead of the crystal amorphous phase change.

(Method of Increasing Density)

The amount of information to be recorded on one recording medium, i.e., the recording capacity can be increased by the following two methods. One is a method which decreases the pitch of recording marks in the track direction. If downsizing advances to a certain degree, however, recording marks become smaller than the size of a light beam for playback, so a playback beam spot may temporarily contain two recording marks. If the recording marks are well separated from each other, the playback signal is largely modulated, so a large amplitude signal is obtained. If the recoding marks are close to each other, however, a small amplitude signal is obtained, so an error readily occurs upon conversion into digital data.

The other recording density increasing method is to decrease the track pitch. This method can increase the recording density without being largely influenced by the reduction in signal intensity caused by downsizing of the mark pitch. However, this method has the problem that in a region where the track pitch is equal to or smaller than the size of a light beam, information in a certain track deteriorates while information is written in or erased from an adjacent track. That is, so called cross erase occurs.

The causes of the cross erase are that the edge of a laser beam on an adjacent track directly irradiates a mark, and that a heat flow during recording flows into an adjacent track and raises the temperature of a mark on the adjacent track, thereby deteriorating the shape of the mark. It is necessary to solve these problems in order to increase the density of the phase change recording medium. Also, to accurately read a downsized mark and decrease the probability of a read error at the same time, it is desirable to smoothen the edge of a recording mark to be formed and minimize the noise component.

(Increasing Capacity by Multilayered Medium)

Another method of increasing the capacity is to form a plurality of information recording layers and stack them. Jpn. Pat. Appln. KOKAI Publication No. 2000-322770 discloses this method. A medium designed to read/write information from/on one surface by stacking two layers is called a single side dual-layer medium, or simply called a dual-layer medium. In this single side dual-layer medium, an information layer (to be referred to as L0 hereinafter) formed close to the light incident side must have a transmittance of about 50% or more so as not to decay light more than necessary in L0 when accessing a far information layer (to be referred to as L1 hereinafter). For this purpose, the thickness of a recording film in L0 must be very thin, i.e., 10 nm or less.

Since the film is thin, the holding time necessary for crystallization prolongs, so incomplete erase occurs at a normal rewriting (or overwriting) rate. The proceedings of the 12th Symposium on Phase Change Optical information Storage (Proceedings of PCOS2000), pp. 36-41 disclose that a method of substituting a portion of a GeSbTe recording film with Sn is effective to solve the above problem. Likewise, Jpn. Pat. Appln. KOKAI Publication No. 2001-232941 discloses that it is effective to partially substitute a GeSbTe recording film with Bi, In, Sn, and Pb. To ensure the erase ratio described above, however, it is unsatisfactory to improve the recording film material alone, and necessary to form a film having a crystallization promoting effect in the interface with the recording film.

According to Proceedings of PCOS2000, pp. 36-41, germanium nitride (GeN) is effective as "an interface film having a crystallization promoting effect". However, the present inventors made extensive studies and have found that cross erase occurs and the track pitch cannot be well decreased if the conventional interface film material such as GeN is combined with a very thin film having a film thickness of 10 nm or less of the recording film material described above. The present inventors also made extensive studies and have found that silicon carbide (SiC) reportedly having a crystallization promoting function increases the light attenuation coefficient at a wavelength of 405 nm of a laser beam used for a next generation, high density optical disk, and produces a very large optical loss. In addition, germanium nitride (GeN) and silicon nitride (SiNx) also produce optical losses. On the other hand, a medium having no interface film can suppress recrystallization of the molten portion and reduce cross erase, but has a totally insufficient erase ratio.

(Method of High Speed Recording)

High speed recording is another requirement for phase change optical recording. When recording an image or move, for example, if the image or move can be recorded within a time shorter than the actual playback time, it is possible to facilitate dubbing of a distributed medium or implementation of a so called time shift function which allows the user to watch previous images or moves by tracing back the time during recording of broadcasting. One cause which interferes with high speed recording in phase change recording is the problem that information is incompletely erased when a laser having a relatively low erase level performs crystallization during overwrite, i.e., the problem of an insufficient erase ratio. That is, a recording mark passes through a laser spot at a high speed and hence does not stay in a temperature region capable of crystallization for a sufficiently long time, so information is incompletely erased.

Jpn. Pat. Appln. KOKAI Publication No. 11-213446 discloses a method of increasing the erase rate by promoting crystallization by forming materials such as GeN in the interface with a recording film. However, the present inventors conducted experiments by using the materials disclosed in Jpn. Pat. Appln. KOKAI Publication No. 11-213446 as an interface film without controlling the state of a recording film or the interface state, and have found that the molten portion partially recrystallizes during recording, i.e., to form a recording mark having a necessary size requires melting a range larger than the necessary size. The use of this interface film melts a region more than necessary and therefore accelerates cross erase described earlier, i.e., has a reverse effect from the viewpoint of high density recording. In other words, if information is recorded with a laser power within the range allowable from the point of view of cross erase, the width of the formed recording mark decreases, and the obtained carrier to noise ratio (CNR) lowers. On the other hand, a medium having no interface film can suppress recrystallization of the molten portion and reduce cross erase, but has an entirely insufficient erase ratio. Accordingly, a demand has arisen for a new interface film material capable of suppressing recrystallization of the molten portion during recording while increasing the crystallization rate during erase.

(Film Design of Phase Change Recording Medium)

In the phase change recording medium, as explained in "Phase Change Optical Recording Principle", an amorphous mark is formed (i.e., data is written) in a desired portion of a recording film by irradiation with a laser pulse, or data is erased by crystallizing an amorphous mark by irradiating it with a low power laser. In the former process, an amorphous mark is formed by rapidly cooling a portion irradiated with the laser. In the latter process, an amorphous portion is crystallized as it is gradually cooled. Also, the larger the laser absorbance of the recording film, the lower the laser power necessary to record or erase data; the smaller the absorbance, the larger the laser power necessary to record or erase data. The absorbance of the recording film is determined by the optical characteristics and thermal characteristics of each film material of the medium formed by a multilayered film. For example, it is possible to change the arrangement by the selection of film materials equal in absorbance, and produce the anisotropy of thermo-physical properties between a rapid cooling structure and slow cooling structure or between the longitudinal direction and sectional direction of a film.

That is, film design of the phase change recording medium includes optical design and thermal design. For optical design, it is necessary to grasp the optical characteristics of each thin film. For thermal design, it is necessary to grasp the thermo-physical properties such as the melting point, melting latent heat, and crystallization temperature of each thin film. The optical constant of a thin film can be measured by using an apparatus such as an ellipsometer. Several researches have implicitly indicated that the thermo-physical properties of a nanometer order film are different from bulk thermo-physical properties. However, it is impossible to systematically measure them (the thermo-physical properties of a thin film and bulk thermo-physical properties) while removing the effects of other factors. Therefore, empirical parameters are necessary to correct them (correct the effects of the other factors in order to grasp the thermo-physical properties of a thin film). In particular, there is almost no method of measuring the interface thermal resistance or boundary thermal resistance between nanometer order films. The present inventors made extensive studies on these problems as well, and have established a thermal designing method which takes account of the thermo-physical property values of a thin film and the boundary thermal resistance between thin films measured by a highly accurate method using thermal design, thereby completing this invention.

(Interface Layer Materials)

It is disclosed by, for example, Jpn. Pat. Appln. KOKAI Publication No. 2003-6794 "a technique which mixes a carbide or nitride in several oxides such as $Ta_2O_5$" which aims a sulfur (S) free protective film material, as a known technique which can be an interface layer material having the crystallization promoting function, instead of GeN. The main purpose of Jpn. Pat. Appln. KOKAI Publication No. 2003-6794 is to improve a current DVD using a laser diode having wavelength $\lambda=650$ nm. The material of Jpn. Pat. Appln. KOKAI Publication No. 2003-6794 becomes opaque and increases the optical loss when the next generation blue-violet laser diode ($\lambda=405$ nm) is used. Therefore, this material has the problem in the next generation, high density medium. GeN described above also becomes opaque and increases the optical loss at $\lambda=405$ nm.

Also, Jpn. Pat. Appln. KOKAI Publication No. 2003-323743 discloses a technique concerning $(ZrO_2)M(Cr_2O_3)$ 100-M, i.e., a Zr Cr O system, as a known technique of an interface layer material containing $ZrO_2$. M shows concentration of $ZrO_2$ in the comcound. Although $Cr_2O_3$ is mixed in this material system, the material has a very large attenuation coefficient in the visible light wavelength region, especially $\lambda=405$ nm. Therefore, a thin film having a relatively large attenuation coefficient is formed if the material is a mixed material contained, albeit in a small amount, in the film.

(Material Systems of Recording Film)

A eutectic system recording film uses the melt erase mode in the erase process as described previously, so a cap layer is not required to have the crystallization promoting function. Therefore, details of the recording film such as the film material and micro-structure have not been examined. In addition, since the eutectic system uses the melt erase mode as described above, it is very difficult to perform so called land and groove recording which performs information recording and playback for both a land (L) and groove (G). This is very disadvantageous to increase the recording density.

By contrast, a so called pseudobinary system recording film material such as Ge2Sb2Te5 can rapidly change its phase from an amorphous state to a crystalline state in a solid phase state without taking the melt erase mode (the solid phase erase mode). If the recording film is thin, however, the time required for crystallization relatively prolongs, so it is essential to increase the crystallization rate by controlling the state of the recording film, or use an interface layer material having the crystallization promoting function. This achieves land and groove recording.

As described above, very large amounts of phenomenological findings, crystallographic findings, and findings of the bulk thermo-physical properties and chemical properties concerning the recording film using the phase change system and the interface layer material have been accumulated, and applied to the research, development, and design of media. Presently, however, there is almost no microscopic research or almost no research on, e.g., the electron state of a material.

S.K. Bahl et al. tried to examine the electron state of GeTe which presently has various problems as a phase change recording film material and hence is presumably hardly used (J. Appl. Phys., Vol. (1970), p. 2,196). The research by S. K. Bahl et al. is based on a simple band model from an electron transport phenomenon such as the temperature dependence of the electrical resistivity, and aims at estimating a rough change in band structure between the crystalline state and amorphous state. However, since the research is based upon the simple band model and experimental data is the electron transport phenomenon alone, S. K. Bahl et al. proposed only a very simple band model. This research of course does not contribute to an application to a phase change recording medium.

Also, Ogawa et al. tried to estimate, by calculations, the electron state of Ge2Sb2Te5 as a material usable in a phase change recording medium (Proceedings of PCOS1997, pp. 50-53). That is, Ogawa et al. tried to calculate the band structure from the crystal structure on the basis of, e.g., the temperature dependence of the electrical resistivity, but failed to compare the calculation results with the experimental facts, and hence could not apply the material to a phase change recording medium.

In Jpn. Pat. Appln. KOKAI Publication No. 2000-322770 or 2003-323743, Proceedings of PCOS2000, pp. 36-41, or Proceedings of PCOS1997, pp. 50-53, the phase change information recording medium which performs high speed, high density recording has the problem of recrystallization of the molten region during recording. This readily causes occurrence of cross erase which readily interferes with land and groove recording. Also, it is difficult to implement a high density, large capacity phase change recording medium capable of high speed overwrite which can assure a high crystalline/amorphous contrast and a high CNR even when a short wavelength laser ($\lambda$=405 nm or less) is used, has a sufficiently high erase ratio at a high linear velocity, and is superior in overwrite (OW) cycle characteristics and environmental resistance.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a view for explaining an example of the sectional structure of an optical recording medium according to an embodiment of the present invention;

FIG. 2 is a view showing an example of the arrangement of a sample used to measure the density of state (DOS) of the valence band of a recording film;

FIG. 6 is a view showing examples of the materials of an interface layer (an upper interface film and/or lower interface film) of the optical recording medium (phase change optical disk) according to the embodiment of the present invention;

FIG. 7 is a view showing examples of the composition ratio of Ge to N when GeN was used as the material of the interface layer;

FIG. 8 is a view showing examples of the materials of the recording film (L0 and/or L1) of the optical recording medium (phase change optical disk) according to the embodiment of the present invention;

FIG. 9 is a view for explaining Comparative Example 1 having no interface layer, Comparative Example 2 using $SiO_2$ as an interface layer, and Comparative Example 3 using $Y_2O_3$ as an interface layer;

FIG. 10 is a view showing the results of measurements of the ratio of the DOS of a crystalline state to the DOS of an amorphous state (the DOS of crystalline state/DOS of amorphous state: e.g., au11/au12 in FIG. 20) at an energy level lower by 0.5 (eV) than that at the top of the DOS of the valence band of the recording film, for various combinations of interface layer materials; Note that a direction from the energy level at the top of the DOS of the valence band to a deeper level, e.g., a direction of an increase in the binding energy of the abscissa (x axis) in FIG. 20, i.e., a direction toward the left of the abscissa is a lower side of the energy level from the top of the DOS of the valence band;

FIG. 11 is a view showing the results of measurements of the ratio of the DOS of a crystalline state to the DOS of an amorphous state (the DOS of crystalline state/DOS of amorphous state: e.g., au01/au02 in FIG. 19), for combinations of interface layer materials (including a case in which no interface layer was formed) different from those shown in FIG. 10;

FIG. 12 is a view showing examples of evaluation conditions for evaluating the recording film by the land and groove recording method;

FIG. 13 is a view showing the recording film evaluation results (the CNR, SbER, and ER) of a plurality of samples;

FIG. 14 is a view showing other recording film evaluation results (the erase ratios ER at different linear velocities) of a plurality of samples;

FIG. 15 is a view showing the evaluation results (the CNR and SbER) of recording films having various compositions;

FIG. 16 is a view showing the evaluation results (the CNR and SBER) when small amounts of N were added to recording films having various compositions;

FIG. 17 is a view showing the evaluation results (the CNR, SbER, and ER) of Comparative Example 4 having no interface layer, Comparative Example 5 using SiO2 as an interface layer, and Comparative Example 6 using $Y_2O_3$ as an interface layer;

FIG. 18 is a view showing other evaluation results (the ER at different liner velocities) of Comparative Examples 5 and 6 respectively using SiO2 and $Y_2O_3$ as interface layers;

FIG. 19 is a graph for explaining the ratio of the DOS of a crystalline state to the DOS of an amorphous state (the DOS of crystalline state/DOS of amorphous state) at an energy level lower by 0.5 (eV) than that at the top of the DOS of the valence band of the recording film, for a case in which no interface layer was formed;

FIG. 20 is a graph for explaining the ratio of the DOS of a crystalline state to the DOS of an amorphous state (the DOS of crystalline state/DOS of amorphous state) at an energy level lower by 0.5 (eV) than that at the top of the DOS of the valence band of the recording film, for a case in which an interface layer was formed;

FIG. 21 is a GeSbTe tertiary phase diagram for explaining a preferable composition range of the recording film of the optical recording medium according to the embodiment of the present invention;

FIG. 22 is a GeBiTe tertiary phase diagram for explaining a preferable composition range of the recording film of the optical recording medium according to the embodiment of the present invention; and FIG. 23 is a Ge/Sn Sb/Bi Te tertiary phase diagram (when Ge and/or Sb shown in FIG. 21 is substituted with Sn and/or Bi) for explaining a preferable composition range of the recording film of the optical recording medium according to the embodiment of the present invention.

DETAILED DESCRIPTION

Figure 3:
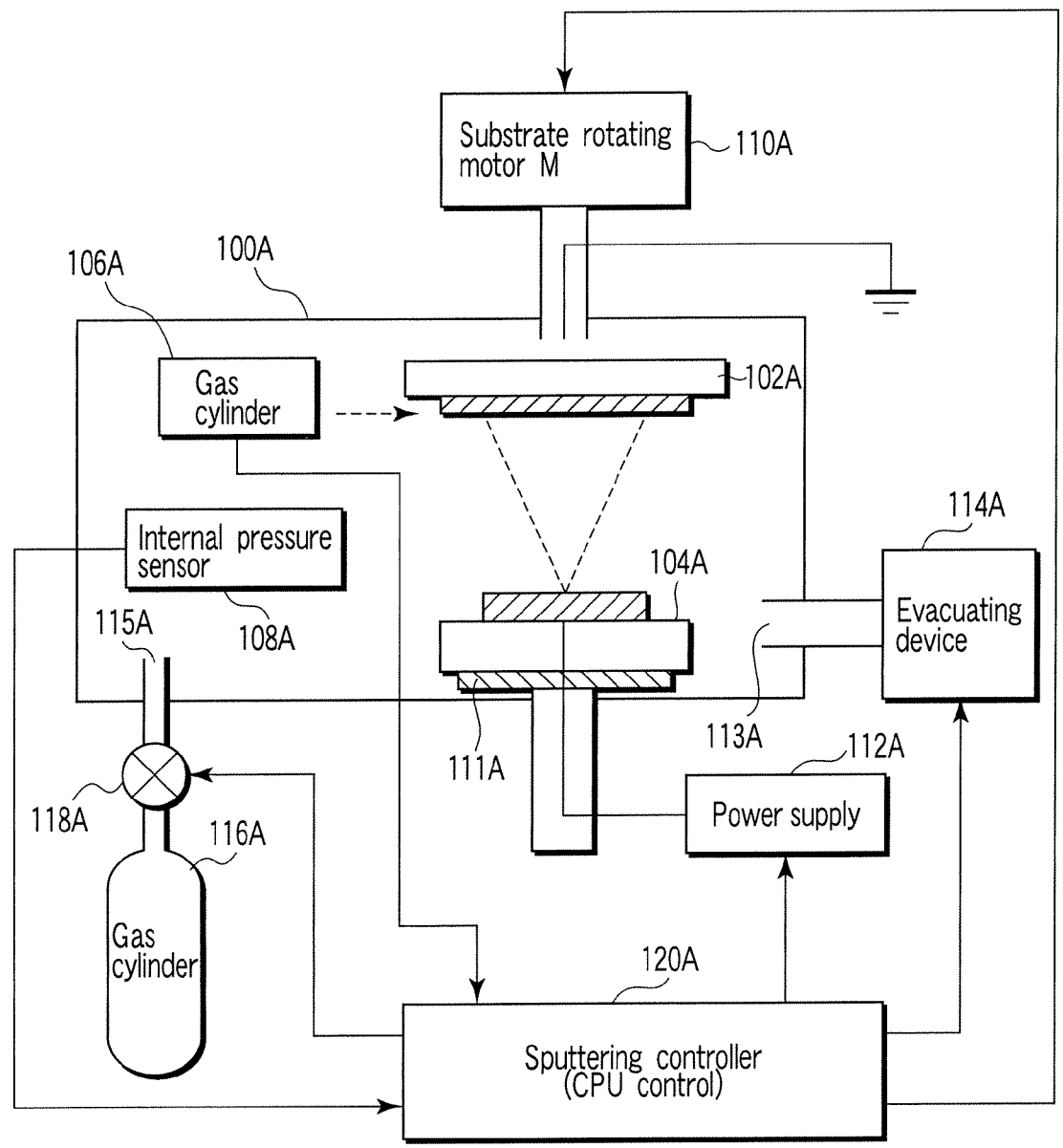
FIG. 3 is a view for explaining an apparatus for manufacturing the optical recording medium (a phase change optical disk) according to the embodiment of the present invention.

Various embodiments according to the invention will be described hereinafter with reference to the accompanying drawings. In general, according to one embodiment of the invention, in a phase change recording medium according to an embodiment of the present invention, an element forming a recording film has segregation or a concentration distribution in the thickness direction of the recording film from a portion in contact with the recording film.

According to an embodiment, FIG. 1 shows an example of the layer arrangement of an optical recording medium (RW or RAM type phase change recording optical disk) 100 according to an embodiment of the present invention. The optical recording medium 100 is a multilayered optical disk having a plurality of (two, i.e., L0 and L1 in this embodiment) information layers. When viewed from the laser beam incident side, the optical recording medium 100 includes an L0 information layer 19, interlayer separation layer (adhesive layer) 18, and L1 information layer 20. The L0 information layer 19 is formed by sequentially stacking a first interference film (to be also referred to as a protective film or dielectric film hereinafter) 11a, lower interface film 12a, L0 recording film 13a, upper interface film 14a, second interference film 15a, reflecting film 16a, and third interference film 17a on a substrate 1a which is transparent to a laser beam (a short wavelength laser having a wavelength of 405 nm or less) to be used. By contrast, the L1 information layer 20 is formed by sequentially stacking a reflecting film 16b, second interference film 15b, upper interface film 14b, L1 recording film 13b, lower interface film 12b, and first interference film 11b on a transparent substrate 1b. The optical recording medium (RW or RAM type phase change recording optical disk) 100 according to this embodiment has a structure in which the first interference film 11 of the L1 information layer 20 and the third interference film 17 of the L0 information layer 19 are adhered by using the interlayer separation layer 18 as an adhesive.

In the multi-layered of the L0 information layer 19, the third interference film 17a also functions as a dielectric film (e.g., $ZnS+SiO_2$) which contributes to optical enhancement and/or thermal diffusion.

A very thin oxide film 21a having a predetermined thickness (about 0.1 to 1.0 nm as an average thickness) is formed on at least one of (preferably both) the upper and lower surfaces of the L0 recording film 13a. A very thin oxide film 21b having a predetermined thickness (about 0.1 to 1.0 nm as an average thickness) is formed on at least one of (preferably both) the upper and lower surfaces of the L1 recording film 13b. The very thin oxide films 21a and 21b are made of the same constituent elements (e.g., Ge and Te) of the recording films 13a and 13b.

Note that in FIG. 1, components denoted by the same reference numerals except for suffixes "a" and "b" basically indicate components having the same functions. For example, the L0 recording film 13a and L1 recording film 13b are physically different components but have a common function as a recording film for recording information. However, the first interference films 11a and 11b are both dielectric films but do not have a common function as a protective film (therefore, they are also referred to as "protective film or dielectric film"). That is, when the L1 information layer 20 is formed on the substrate 1b (before adhesion by the adhesive layer 18), the first interference film 11b can function as a protective layer (for the recording film). However, when the L0 information layer 19 is formed on the substrate 1a, the first interference film 11a need not function as a protective layer (because the substrate 1a covers the first interference film 11a). In this case, the third interference film 17a can function as a protective layer before adhesion by the adhesive layer 18. Furthermore, "film" used in terms such as an interference film and interface film will be properly referred to as "layer" depending on a portion being explained, but there is no substantial difference between them. In addition, reference numerals having no suffixes "a" and "b" denote components denoted by the same reference numerals having the suffixes "a" and "b" (for example, an interference film 11 indicates the interference film 11a or 11b).

The arrangement of the phase change recording medium according to this embodiment of the present invention is not limited to that shown in FIG. 1. For example, another dielectric film (not shown) may also be formed between the second interference film 15a or 15b and reflecting film 16a or 16b. All the interference films 11a, 11b, 15a, 15b, 17a, and 17b may also be replaced with the materials of the interface films 12a and 12 or 14a and 14b, thereby omitting the interference films. The reflecting film 16a or 16b may also be formed by a plurality of stacked metal films. A dielectric film (not shown) may also be formed on the reflecting film 16a or 16b.

In the two layered medium as shown in FIG. 1, the first information layer (L0 information layer) 19 side close to the light incident surface and the second information layer (L1 information layer) 20 side far from the light incident surface each having the arrangement as described above are formed and adhered by the adhesive layer 18 to isolate them via the adhesion layer 18. This similarly applies to a multilayered medium having three or more layers (although not shown, when the number of information layers is three, a second interlayer separation layer and L2 information layer are stacked between the substrates 1a and 1b shown in FIG. 1; when the number of information layers is four, second and third interlayer separation layers and L2 and L3 information layers are stacked between the substrates 1a and 1b shown in FIG. 1).

It is also possible to form various types of films on the substrate 1a and/or substrate 1b, and adhere a thin transparent sheet (not shown) about 0.1 mm thick on these films, thereby obtaining a medium on which light enters through the transparent sheet (it is assumed that this medium is used together with an objective lens having a high NA of about 0.85). This is so because even when the thin transparent cover layer about 0.1 mm thick is formed on the light incident side, there are no big differences between the characteristics required of the recording film, interface layer material, protective film material, and reflecting film material used in the embodiment shown in FIG. 1 (when a 0.6 mm thick transparent substrate is used).

An optical recording medium (phase change optical disk) favorable in practicing the present invention has the following arrangements and/or characteristics.

<1> In the recording medium 100 which has the substrates 1a and 1b and the multi-layered 19 and 20 including the interference films (protective films or dielectric films) 11a and 11b, the recording films 13a and 13b capable of reversibly changing the atomic arrangement, the crystallization promoting films 12a, 12b, 14a, and 14b in contact with the recording films, and the reflecting films 16a and 16b, and in which information is reversibly recorded in or erased from the recording films 13a and 13b, the elements (e.g., Ge and Te) forming the recording films 13a and 13b have segregation or concentration distributions as shown FIG. 5 in the thickness direction of the recording films 13a and 13b from portions 21a and 21b in contact with the recording films 13a and 13b.

<2> In the portions 21a and 21b in contact with the recording films 13a and 13b, the very thin oxide films 21a and 21b having an average thickness of 0.1 (inclusive) to 1 (inclusive) nm of elements made of the constituent elements (e.g., Ge and Te) of the recording films 13a and 13b are formed.

<3> The multi-layered 19 includes the dielectric films (e.g., ZnS+SiO$_2$) 11a, 15a, and 17a which contribute to optical enhancement and/or thermal diffusion.

<4> The interference film (protective film or dielectric film: e.g., 11b in FIG. 1) functions as a protective film for the recording film (e.g., 13b shown in FIG. 1).

<5> The ratio of the DOS of a crystalline state to the DOS of an amorphous state (the DOS of crystalline state/DOS of amorphous state: e.g., au11/au12 shown in FIG. 20) at an energy level lower by 0.5 (eV) than that at the top, e.g., a portion where the binding energy is 0 (eV) in FIG. 20, of the DOS of the valence band of the recording films 13a and 13b is 1.0 (inclusive) to 2.5 (inclusive).

<6> The ratio of the DOS of a crystalline state to the DOS of an amorphous state (the DOS of crystalline state/DOS of amorphous state: e.g., au13/au14 or au15/au16 shown in FIG. 20) at an energy level lower by 0.25 to 1.0 (eV) than that at the top (where the binding energy is 0 (eV)) of the DOS of the valence band of the recording films 13a and 13b may also be 1.0 (inclusive) to 2.5 (inclusive). The top energy of the valence band is conventionally represented by binding energy=0 (eV) when measured by XPS or the like. This does not indicate that the binding energy between atoms is 0. The energy level of the valance band using XPS or the like can be corrected on the basis of the known peak as a reference.

<7> The crystallization promoting films 12a, 12b, 14a, and 14b are formed by the upper interface films 14a and 14b each in contact with one surface of a corresponding one of the recording films 13a and 13b and the lower interface films 12a and 12b each in contact with the other surface of a corresponding one of the recording films 13a and 13b, and the upper interface films 14a and 14b and lower interface films 12a and 12b are controlled (arranged) such that the crystallization rates are different above and below the recording films 13a and 13b.

<8> It is also possible to form the crystallization promoting films 12a, 12b, 14a, and 14b by the upper interface films 14a and 14b each in contact with one surface of a corresponding one of the recording films 13a and 13b or the lower interface films 12a and 12b each in contact with the other surface of a corresponding one of the recording films 13a and 13b, and control (arrange) the upper interface films 14a and 14b or the lower interface films 12a and 12b such that the crystallization speeds are different above and below the recording films 13a and 13b.

<9> The crystallization promoting films 12a, 12b, 14a, and 14b can be made of germanium nitride (GeN), germanium nitride chromium (GeCrN), zirconium oxide (ZrO$_2$), stabilized zirconia+chromium oxide (ZrO$_2$+Cr$_2$O$_3$), stabilized zirconia+silicon oxide+chromium oxide (ZrO$_2$+SiO$_2$+Cr$_2$O$_3$), zircon+chromium oxide (ZrSiO4+Cr$_2$O$_3$), or hafnium oxide (HrO$_2$). The crystallization promoting films can also be made of a compound (HfO$_{(2-x)}$N$_x$) containing hafnium (Hf), oxygen (O), and nitrogen (N). The crystallization promoting films can also be made of a film ((ZrO$_{(2-x)}$N$_x$)$_{(1-y)}$((Y$_2$O$_3$)$_{(1-z)}$(Nb$_2$O$_5$)$_z$)$_y$ wherein z=0) containing zirconium (Zr), oxygen (O), nitrogen (N), and yttrium (Y). The crystallization promoting films can also be made of a film ((ZrO$_{(2-x)}$N$_x$)$_{(1-y)}$((Y$_2$O$_3$)$_{(1-z)}$(Nb$_2$O$_5$)$_z$)$_y$ wherein z=1) containing zirconium (Zr), oxygen (O), nitrogen (N), and niobium (Nb). The crystallization promoting films can also be made of a film ((ZrO$_{(2-x)}$N$_x$)$_{(1-y)}$((Y$_2$O$_3$)$_{(1-z)}$(Nb$_2$O$_5$)$_z$)$_y$ wherein 0<z<1) containing zirconium (Zr), oxygen (O), nitrogen (N), yttrium (Y), and niobium (Nb). The crystallization promoting films can also be made of chromium oxide (Cr$_2$O$_3$), zinc oxide (ZnO), zinc oxide+tantalum oxide (ZnO+Ta$_2$O$_5$), zinc oxide+tantalum oxide+indium oxide (ZnO+Ta$_2$O$_5$+In$_2$O$_3$), tin oxide (SnO$_2$), tin oxide+antimony oxide (SnO$_2$+Sb$_2$O$_3$), tin oxide+tantalum oxide (SnO$_2$+Ta$_2$O$_5$), or tin oxide+niobium oxide (SnO$_2$+Nb$_2$O$_5$).

Note that zirconium oxide (ZrO$_2$) pertaining to the embodiment of the present invention is stabilized zirconia normally represented by ZrO$_2$+Y$_2$O$_3$ wherein the concentration of Y$_2$O$_3$ is about 3 to 5 mol %. Stabilized zirconia is not limited to ZrO$_2$+Y$_2$O$_3$ and can also be ZrO$_2$+Nb$_2$O$_5$ or ZrO$_2$+MgO. If ZrO$_2$ is singly used, the thermal expansion coefficient abruptly changes owing to, e.g., phase transition of the crystal structure caused by temperature changes, thereby posing various problems. Therefore, zirconium oxide (ZrO$_2$) having undergone various countermeasures in order to alleviate or almost eliminate these problems is called stabilized zirconia in this specification.

<10> One of the upper interface film 14a or 14b and lower interface film 12a or 12b sandwiching the recording film 13a or 13b from its two surfaces can be made of germanium nitride (GeN), germanium nitride chromium (GeCrN), zirconium oxide (ZrO$_2$), stabilized zirconia+chromium oxide (ZrO$_2$+Cr$_2$O$_3$), stabilized zirconia+silicon oxide+chromium oxide (ZrO2+SiO$_2$+Cr$_2$O$_3$), zircon+chromium oxide (ZrSiO4+Cr$_2$O$_3$), or hafnium oxide (HfO$_2$). The upper or lower crystallization promoting film can also be made of a compound (HfO$_{(2-x)}$N$_x$: 0.1≦x≦0.2) containing hafnium (Hf), oxygen (O), and nitrogen (N). The upper or lower crystallization promoting film can also be made of a film ((ZrO$_{(2-x)}$N$_x$)$_{(1-y)}$((Y$_2$O$_3$)$_{(1-z)}$(Nb$_2$O$_5$)$_z$)$_y$ wherein z=0) containing zirconium (Zr), oxygen (O), nitrogen (N), and yttrium (Y). The upper or lower crystallization promoting film can also be made of a film ((ZrO$_{(2-x)}$N$_x$)$_{(1-y)}$((Y$_2$O$_3$)$_{(1-z)}$(Nb$_2$O$_5$)$_z$)$_y$ wherein z=1) containing zirconium (Zr), oxygen (O), nitrogen (N), and niobium (Nb). The upper or lower crystallization promoting film can also be made of a film ((ZrO$_{(2-x)}$N$_x$)$_{(1-y)}$((Y$_2$O$_3$)$_{(1-z)}$(Nb$_2$O$_5$)$_z$)$_y$ wherein 0<z<1) containing zirconium (Zr), oxygen (O), nitrogen (N), yttrium (Y), and niobium (Nb).

The other one of the upper interface film 14a or 14b and lower interface film 12a or 12b can be made of chromium oxide (Cr$_2$O$_3$), zinc oxide (ZnO), zinc oxide+tantalum oxide (ZnO+Ta$_2$O$_5$), zinc oxide+tantalum oxide+indium oxide (ZnO+Ta$_2$O$_5$+In$_2$O$_3$), tin oxide (SnO$_2$), tin oxide+antimony oxide ($SnO_2+Sb_2O_3$), tin oxide+tantalum oxide ($SnO_2+Ta_2O_5$), or tin oxide+niobium oxide ($SnO_2+Nb_2O_5$).

<11> When the recording films 13*a* and 13*b* contain germanium (Ge), antimony (Sb), and tellurium (Te) and the composition is represented by $Ge_xSb_yTe_z$ wherein x+y+z=100, the recording films 13*a* and 13*b* can have, e.g., a composition A1 shown in FIG. 21 in an area defined by x=55·z=45, x=45·z=55, x=10·y=28·z=42, and x=10·y=36·z=54 on a GeSbTe tertiary phase diagram shown in FIG. 21, or a composition B1 shown in FIG. 21 on that area.

<12> One to 5 at. % of nitrogen (N) can be added to the GeSbTe based compound having the above composition.

<13> When the recording films 13*a* and 13*b* contain at least germanium (Ge), bismuth (Bi), and tellurium (Te) and the composition is represented by GexBiyTez wherein x+y+z=100, the recording films 13*a* and 13*b* can have, e.g., a composition A2 shown in FIG. 22 in an area defined by x=55·z=45, x=45·z=55, x=10·y=28·z=42, and x=10·y=36·z=54 on a GeBiTe tertiary phase diagram shown in FIG. 22, or a composition B2 shown in FIG. 22 on that area.

<14> One to 5 at. % of nitrogen (N) can be added to the GeBiTe based compound having the above composition.

<15> When the composition of the recording films 13*a* and 13*b* is partially substituted with bismuth (Bi) and/or indium (In) and/or tin (Sn) and the substituted composition is represented by $(Ge_{(1-w)}Sn_w)_x(Sb_v(Bi_{(1-u)}In_u)_{(1-v)})_yTe_z$ wherein x+y+z=100, w, v, and u in this composition can fall to satisfy 0≦w<0.5, 0≦v<0.7, and 0≦u≦1.

<16> One to 5 at. % of nitrogen (N) can be added to the compounds represented by GeSnSbTe, GeSnSbTeIn, GeSbTeIn, GeSbTeBiIn, GeSbSnTeBiIn, GeSbTeBi, GeBiTeIn, GeSnSbTeBi, and GeSnSbTeBiIn having the above compositions.

Embodiments and examples of single side dual-layer media will be explained below. Also, as measurement data of prototype optical disks, the worst value of each experiment in each land (L) and groove (G) of L0 and L1 is indicated as a representative value. The transmittance, reflectance, and the like of each prototype optical recording medium were measured using a spectrophotometer. The concentration of each element in a thin film was measured using an analytical method such as ICP (Induced Coupled Plasma), RBS (Rutherford Backscattering Spectrometry), SIMS (Secondary Ion Mass Spectroscopy), TOF SIMS, or XPS (X ray Photoelectron Spectroscopy). The bound form of elements in a film was detected by, e.g., XPS or IR (InfraRed spectrometry) measurement. The thermal conductivity and thermal diffusivity of a thin film and the boundary thermal resistance between stacked thin films were evaluated by the thermoreflectance method. The DOS of the valence band of the recording film can be measured using XPS, UPS, or HX PES (Hard X ray PhotoElectron Spectroscopy). Information concerning the DOS can also be obtained by measurement of the electron specific heat or the like.

FIG. 2 is a view showing an example of the arrangement of a sample used to measure the DOS of the valance band of the recording film. A substrate 1 shown in FIG. 2 is made of polycarbonate (PC) or the like. The following layers are formed on a groove formation surface of the substrate 1 by using a sputtering apparatus. That is, in an L0 information layer formed close to the laser beam incident side, e.g., the layer denoted by reference numeral 19 in FIG. 1, an interference film ($ZnS+SiO_2$) 15, interface layer 14, recording film layer 13, interface layer 12, interference film ($ZnS+SiO_2$) 11, and the like are sequentially formed. In an L1 information layer formed far from the light incident side, e.g., the layer denoted by reference numeral 20 in FIG. 1, a reflecting film (Ag alloy) 16, interference film ($ZnS+SiO_2$) 15, interface layer 14, recording film layer 13, interface layer 12, interference film ($ZnS+SiO_2$) 11, and the like are sequentially formed on the substrate.

In the embodiment of the present invention, the DOS of the valence band of the recording film is measured by mainly using HX PES (Hard X ray Photoelectron Spectroscopy) or XPS. The measurement of the DOS of the valance band of the recording film performed by HX PES uses the sample shown in FIG. 2 in which the recording film 13 capable of reversibly changing the atomic arrangement, the films 12 and 14 in contact with the recording film 13 and having the crystallization promoting function, the protective film 11, and the reflecting film 16 are formed on the substrate 1. The recording film 13 is amorphous as depo., i.e., as it is deposited. When a polycarbonate (PC) substrate is used, crystallization (laser annealing) is performed using an initialization apparatus. When an Si or glass substrate is used, crystallization can be performed by heating to the crystallization temperature or more for a predetermined time in an electric furnace or the like.

The top energy of the DOS of the valence band is equivalent to the Fermi energy in an electrical conductor. In a semiconductor, the Fermi energy exists in substantially the center of the band gap between the valance band and conduction band. In a semiconductor, a local level sometimes forms in accordance with whether a donor impurity or acceptor impurity is doped. In this case, the Fermi level slightly rises or lowers.

Examples of a method of controlling the ratio of the DOS of a crystalline state to the DOS of an amorphous state (the DOS of crystalline state/DOS of amorphous state) at an energy level lower than that at the top of the DOS of the valence band of the recording film in the crystalline state and amorphous state are: (i) a method (micro segregation) of slightly changing the composition in the thickness direction of the recording film, (ii) a method (micro reaction) of appropriately selecting the interface layer materials arranged above and below the recording film, thereby changing elements slightly doped from the interface layers into the recording film, and (iii) a method of forming, in a portion in contact with the recording film, a very thin oxide film having an average thickness of 0.1 (inclusive) to 1 (inclusive) nm of the elements forming the recording film.

It is also possible to make the crystallization rates different above and below the recording film by, e.g., (i) slightly changing the composition in the thickness direction of the recording film and/or (ii) appropriately selecting the interface layer materials arranged above and below the recording film, thereby changing elements slightly doped from the interface layers into the recording film.

For example, in the micro segregation model, if Ge as an element in a GeSbTe based film segregates, portions where the amounts of Ge are large and small or portions where the amounts of other elements (Sb and Te) are large and small function as nuclei for crystallization, thereby increasing the number of nuclei compared to a recording film having no segregation. This presumably contributes to high speed crystallization. However, this method has no effect if the degree of segregation is as large as phase separation, so segregation must be micro segregation which can be found by only precise analysis. Since an element having micro segregation depends on the recording film and interface layer used and on their processes, the method can be controlled by appropriately selecting these factors.

On the other hand, in the micro reaction model or micro doping model, Te oxidizes more hardly than Ge and Bi in, e.g., a GeBiTe based film. That is, Ge and Bi oxidize or react more readily than Te. For example, when Ge and Bi slightly oxidize, unoxidized Te functions as nuclei for crystallization, or slightly oxidized GeOx and BiOx function as nuclei, thereby increasing the number of nuclei compared to the conventional recording film. This probably contributes to high speed crystallization. Since an element having micro segregation depends on the recording film and interface layer used and on their processes, the method can be controlled by appropriately selecting these factors. This makes it possible to make the crystallization rates different above and below the recording film, which is apparently presumably difficult to control.

(i) The method of slightly changing the composition in the thickness direction of the recording film can be achieved by several means, e.g., by changing the discharge gas amount and/or discharge power during a period from the start to end of sputtering. The discharge gas amount can be changed by, e.g., mixing another gas during discharge.

(ii) The method of forming, in a portion in contact with the recording film 13a or 13b, the very thin oxide film 21a or 21b having an average thickness of 0.1 (inclusive) to 1 (inclusive) nm of elements (e.g., Ge and Te) forming the recording film can be achieved by, e.g., using a material having high oxidizing power as the material of the interface layers 12a or 12b and 14a or 14b, or slightly oxidizing the surface of the recording film 13a or 13b.

The present inventors reached these conventionally unimaginable complicated microscopic reaction models by combining the various analytical methods and extensively studying the mechanisms.

FIG. 3 is a view for explaining an apparatus for manufacturing the optical recording medium (phase change optical disk) according to the embodiment of the present invention. In the vicinity of an upper portion in FIG. 3 in a vacuum vessel 100A, a disk like rotary base 102A for supporting a PC substrate is disposed such that the rotational surface is horizontal (perpendicular to the drawing surface) in FIG. 3. The lower surface of the rotary base 102A supports a PC substrate, and a motor 110A rotates the substrate (an embodiment in which the substrate is not rotated is also possible).

In the vicinity of a lower portion in FIG. 3 in the vacuum vessel 100A, an anode plate 104A having a sputtering source (target material) on it is disposed so as to oppose the rotary base 102A in the upper portion. A rotatable magnet 111A is disposed below the anode plate 104A. The rotary base (cathode plate) 102A is grounded. The anode plate 104A connects to a radio frequency power supply 112A when performing RF sputtering. (The anode plate 104A connects to a DC power supply when performing DC sputtering.) During sputtering, the power supply 112A applies an output voltage between the grounded cathode plate 102A and anode plate 104A.

The vacuum vessel 100A connects to an evacuating device 114A through a gas exhaust port 113A. When executing sputtering, a gas cylinder 116 injects, through a gas supply port 115A and control valve 118A, a slight amount of a sputtering gas (e.g., an inert gas such as argon) to the vacuum vessel 100A well evacuated by the evacuating device 114A. An internal pressure sensor (vacuum gauge) 108A attached to the vacuum vessel 100A checks the injection amount of the sputtering gas. A sputtering controller 120A which is a computer controls the substrate rotating motor 110A, magnet 111A, sputtering power supply 112A, evacuating device 114A, and control valve 118A.

A monitoring device 106A having a film thickness measuring function is disposed above the sputtering source on the anode plate 104A. A CPU of the controller 120A causes the monitoring device 106A to monitor the sputtering amount from the sputtering source to the substrate. That is, the CPU of the controller 120A is programmed to adjust the RF power from the power supply 112A to the anode plate 104A while monitoring a thin film sputtered on the substrate, so that the thin film layer has a predetermined composition (or predetermined film thickness). Note that the vacuum vessel 100A shown in FIG. 3 has a load lock chamber and process chamber (neither is shown) which function independently of each other during sputtering.

Figure 4:
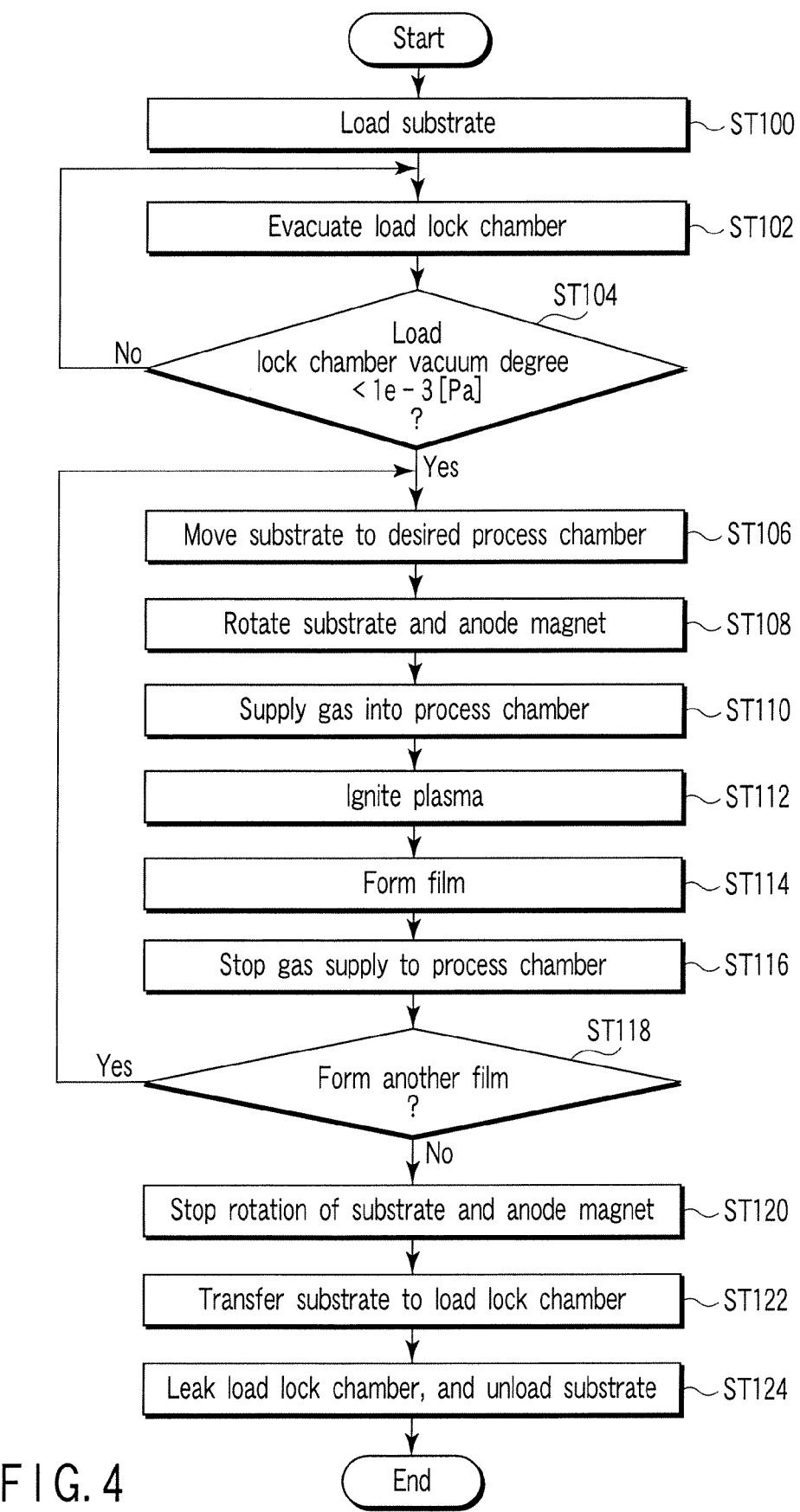
FIG. 4 is a flowchart for explaining steps of manufacturing the optical recording medium (phase change optical disk) according to the embodiment of the present invention.

FIG. 4 is a flowchart for explaining steps in manufacturing the optical recording medium (phase change optical disk) according to the embodiment of the present invention. First, a substrate 1a or 1b is loaded (manually or by a robot arm) in a predetermined portion of a sputtering apparatus (ST100), and the load lock chamber in the vacuum vessel 100A is evacuated (ST102). If the internal pressure sensor 108A senses that the vacuum degree in the load lock chamber is, e.g., $1 \times 10^{-3}$ (Pa) or less (YES in ST104), the substrate is moved to the process chamber in the vacuum vessel 100A (ST106). When the substrate has been moved to a position where the substrate faces a predetermined target material, the substrate on the cathode plate 102A and the magnet 111A on the anode plate 104A are rotated (ST108).

After that, the gas cylinder 116A supplies a sputtering gas into the process chamber (ST110), and the power supply 112A is activated to start plasma ignition (ST112). In this manner, a thin film corresponding to the composition of the target material is evenly formed on the substrate (ST114). If the film thickness meter 106A detects by monitoring that the thin film having a desired thickness is formed, the gas supply to the process chamber is stopped (ST116), and the formation of one thin film is complete.

To form another thin film on the same substrate (YES in ST118), the processes in ST106 to ST116 are executed again. If the composition of the thin film to be formed is different, the target material is replaced with a corresponding target material, and the components of a gas to be supplied into the chamber are also changed as needed. For example, it is possible to supply only argon or a gas mixture of argon and nitrogen in accordance with the type of film formation.

If all films are completely formed on the same substrate (NO in ST118), the rotation of the substrate on the cathode plate 102A and that of the magnet on the anode plate 104A are stopped (ST120). After that, the substrate having undergone film formation is transferred to the load lock chamber (ST122), the purge gas (for example $N_2$) or air is leaked into the load lock chamber to cancel the vacuum state, and the substrate 1a or 1b having undergone film formation is unloaded (manually or by the robot arm) (ST124). Subsequently, the substrates 1a and 1b having undergone film formation are adhered as shown in FIG. 1 and the like, thereby completing a single sided multilayered optical disk (e.g., a DVD RW or DVD RAM for high density recording).

Figure 5A:
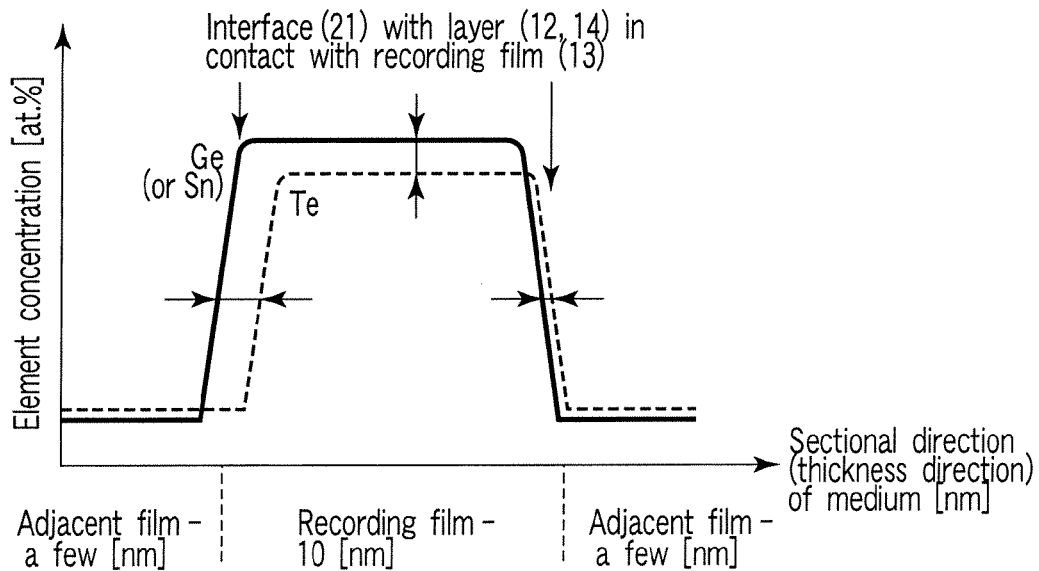
FIGS. 5A to 5C are graphs each showing an example of a state in which elements (e.g., Ge and Te) forming the recording film of the optical recording medium (phase change optical disk) according to the embodiment of the present invention have segregation or concentration distributions.
Figure 5B:
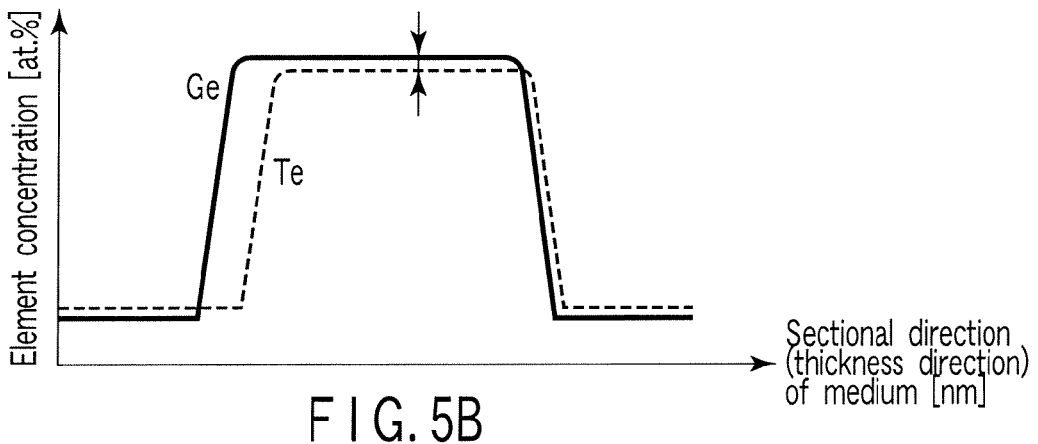
Figure 5C:
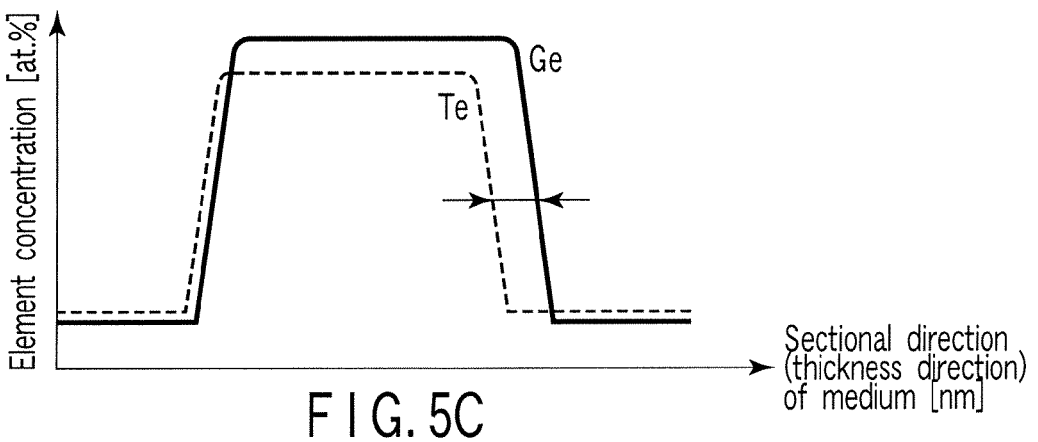

FIGS. 5A to 5C are views each showing a state in which the elements (e.g., Ge and Te) forming the recording film of the optical recording medium (phase change optical disk) according to the embodiment of the present invention have segregation or concentration distributions. Various elements other than Ge an Te form the recording film, and FIG. 8 shows examples. To clearly illustrate segregation or the concentration distribution of each constituent element, however, elements Ge and Te alone are shown as representative examples.

FIG. 5A schematically shows the concentrations (at. %) of the elements within the range of about a few nm from the interface between the recording film 13a or 13b and lower interface film 12a or 12b to the lower interface film, the range of about a few nm from the interface between the recording film 13a or 13b and upper interface film 14a or 14b to the upper interface film, and the ranges of about 10 nm from the interfaces of the recording film 13a or 13b between the above ranges. That is, one (e.g., Ge) of the constituent elements of the recording film segregates by a certain pattern toward the high concentration side within the range of the recording film, and the other (e.g., Te) of the constituent elements of the recording film segregates by another pattern toward the high concentration side within the range of the recording film.

FIGS. 5B and 5C schematically show other examples of segregation patterns. The difference between the element concentrations of Ge and Te in FIG. 5B is smaller than that in FIG. 5A. Also, the change positions of the element concentrations of Ge and Te in, e.g., the horizontal direction of FIG. 5C are opposite to those shown in FIG. 5A. Although not shown, if the recording film is relatively thick, the concentration of each constituent element near the central position in the thickness direction of the recording film may also be lower than that in the shoulder portion.

FIG. 6 is a view showing examples of the material of the interface layer (the upper interface film and/or lower interface film) of the optical recording medium (phase change optical disk) according to the embodiment of the present invention. FIG. 7 is a view showing examples of the composition ratio of Ge and N when GeN is used as the material of the interface layer. FIG. 8 shows examples of the material of the recording film (L0 and/or L1) of the optical recording film (phase change optical disk) according to the embodiment of the present invention. FIG. 9 is a view for explaining Comparative Example 1 having no interface layer, Comparative Example 2 using Si as the interface layer, and Comparative Example 3 using $Y_2O_3$ as the interface layer.

Experiments were conducted by applying the materials shown in FIGS. 6 and 8 to samples having the arrangement shown in FIG. 2. One of the interface layer materials shown in FIG. 6 was placed on the light incident side (the side of the layer 12), and the other interface layer materials were selectively arranged on the reflecting film side (the side of the film 16). Note that compounds having changeable compositions such as GeN and GeCrN have suitable combinations different in composition. FIG. 7 shows examples of different GeN compositions. As comparative examples, experiments were conducted on the interface layer materials shown in FIG. 9.

FIG. 10 is a view showing the results of measurements of the ratio of the DOS of a crystalline state to the DOS of an amorphous state (the DOS of crystalline state/DOS of amorphous state: e.g., $au11/au12$ in FIG. 20) at an energy level lower by 0.5 (eV) than that at the top of the DOS of the valence band of the recording film, for various combinations of interface layer materials. FIG. 11 is a view showing the results of measurements of the ratio of the DOS of a crystalline state to the DOS of an amorphous state (the DOS of crystalline state/DOS of amorphous state: e.g., $au01/au02$ in FIG. 19), for combinations of interface layer materials (including a case in which no interface layer was formed) different from those shown in FIG. 10.

Each of FIGS. 10 and 11 shows the results of measurements of the ratio of the DOS of a crystalline state to the DOS of an amorphous state (the DOS of crystalline state/DOS of amorphous state) at an energy level lower by 0.5 (eV) than that at the top of the DOS of the valence band of the recording film. For each combination shown in FIG. 10, the ratio of the DOS of a crystalline state to the DOS of an amorphous state (the DOS of crystalline state/DOS of amorphous state) at an energy level lower by 0.5 (eV) than that at the top of the DOS of the valence band of the recording film was 1.0 (inclusive) to 2.5 (inclusive). On the other hand, this ratio of each comparative example shown in FIG. 11 was 4 or more. In high speed phase transition, it is important to control to 1.0 (inclusive) to 2.5 (inclusive) the ratio of the DOS of a crystalline state to the DOS of an amorphous state (the DOS of crystalline state/DOS of amorphous state) at an energy level lower by 0.5 (eV) than that at the top of the DOS of the valence band of the recording film.

FIG. 19 is a graph for explaining the ratio of the DOS of a crystalline state to the DOS of an amorphous state (the DOS of crystalline state/DOS of amorphous state) at an energy level lower by 0.5 (eV) than that at the top of the DOS of the valence band of the recording film, for a case in which no interface layer was formed. FIG. 20 is a graph for explaining the ratio of the DOS of a crystalline state to the DOS of an amorphous state (the DOS of crystalline state/DOS of amorphous state) at an energy level lower by 0.5 (eV) than that at the top of the DOS of the valence band of the recording film, for a case in which an interface layer was formed.

A recording medium which reversibly records and erases information by using light and comprises a substrate, a recording film capable of reversibly changing the atomic arrangement, a film in contact with the recording film and having the crystallization promoting function, a protective film, a reflecting film, and a dielectric film contributing to optical enhancement and/or thermal diffusion, and in which the ratio of the DOS of a crystalline state to the DOS of an amorphous state (the DOS of crystalline state/DOS of amorphous state) at an energy level lower by 0.5 (eV) than that at the top of the DOS of the valence band of the recording film is 1.0 (inclusive) to 2.5 (inclusive) has favorable characteristics. FIGS. 10 and 13 to 16 show examples. This corresponds to the fact that $au11/au12$ (or $au13/au14$ or $au15/au16$) in FIG. 20 showing the case in which the interface layer was formed falls within the range of a DOS ratio of 1.0 (inclusive) to 2.5 (inclusive). By contrast, in the case shown in FIG. 19 in which no interface layer was formed, the DOS ratio ($au01/au02$, $au03/au04$, or $au05/au06$) exceeds 2.5, so the results are unfavorable (FIGS. 9, 11, 17, and 18).

The following explanation will be made by assuming that the top energy of the DOS of the valence band is the Fermi energy (Fermi level) for convenience. At room temperature, the Fermi energy has a fluctuation of about 25 (meV). Note that the present inventors use an energy level lower by 0.5 (eV) than that at the top of the DOS of the valence band as a reference, but the same tendency is found to an energy level lower by about 1.0 (eV) than that at the top of the DOS of the valence band (including an energy level lower by about 0.25 (eV) than that at the top of the DOS of the valence band). However, the preset inventors searched for conditions with a high S/N ratio, and determined the reference (an energy level lower by 0.5 (eV) than that at the top of the DOS of the valence band) as described above as one of the most favorable conditions.

When the ratio of the DOS of a crystalline state to the DOS of an amorphous state (the DOS of crystalline state/DOS of amorphous state) at an energy level lower by 0.5 (eV) than that at the top of the DOS of the valence band of the recording film is 2.5 or less, the crystalline state and amorphous state are close to each other as electron states, and the short range regularity of the amorphous state increases. This facilitates phase transition between the crystalline state and amorphous state, thereby allowing high speed phase transition between them.

When the ratio of the DOS of a crystalline state to the DOS of an amorphous state (the DOS of crystalline state/DOS of amorphous state) at an energy level lower by 0.5 (eV) than that at the top of the DOS of the valence band of the recording film is 1.0, the crystalline state and amorphous state are completely the same as electron states, and the short range regularity of the amorphous state further increases. This further increases the speed of phase transition between the crystalline state and amorphous state.

On the other hand, if the ratio of the DOS of a crystalline state to the DOS of an amorphous state (the DOS of crystalline state/DOS of amorphous state) at an energy level lower by 0.5 (eV) than that at the top of the DOS of the valence band of the recording film is higher than 2.5, the crystalline state and amorphous state are different from each other as both crystalline states and electron states, and the short range regularity of the amorphous state largely decreases. Since the amorphous state has almost no long range regularity, a high energy is required to cause phase transition between the crystalline state and amorphous state, so no high speed phase transition is possible.

Accordingly, an optical recording medium in which the ratio of the DOS of a crystalline state to the DOS of an amorphous state (the DOS of crystalline state/DOS of amorphous state) at an energy level lower by 0.5 (eV) than that at the top of the DOS of the valence band of the recording film is 1.0 (inclusive) to 2.5 (inclusive) is favorable. When films having the crystallization promoting function, e.g., the interface films 12a or 12b and 14a or 14b shown in FIG. 1 are formed in contact with the recording film, the speed of phase transition between the crystalline state and amorphous state further increases.

(Interface Film)

Examples of the material of the interface film formed in contact with the recording film and having the crystallization promoting function are elements, compounds, and combinations of elements and/or compounds such as i) germanium nitride (GeN), ii) germanium nitride chromium (GeCrN), iii) zirconium oxide ($ZrO_2$), iv) stabilized zirconia+chromium oxide ($ZrO_2+Cr_2O_3$), v) stabilized zirconia+silicon oxide+chromium oxide ($ZrO_2+SiO_2+Cr_2O_3$), vi) zircon+chromium oxide ($ZrSiO_4+Cr_2O_3$), vii) hafnium oxide ($HfO_2$), viii) a compound ($HfO_{(2-x)}N_x$) containing hafnium (Hf), oxygen (O), and nitrogen (N), ix) a compound ($(ZrO_{(2-x)}N_x)_{(1-y)}((Y_2O_3)(1-z)(Nb2O5)z)y$ wherein z=0) containing zirconium (Zr), oxygen (O), nitrogen (N), and yttrium (Y), x) a compound $((ZrO_{(2-x)}N_x)_{(1-y)}((Y_2O_3)_{(1-z)}(Nb_2O_5)_z)_y$, wherein z=1) containing zirconium (Zr), oxygen (O), nitrogen (N), and niobium (Nb), xi) a compound $((ZrO_{(2-x)}N_x)_{(1-y)}((Y_2O_3)_{(1-z)}(Nb_2O_5)_z)_y$ wherein 0<z<1) containing zirconium (Zr), oxygen (O), nitrogen (N), yttrium (Y), and niobium (Nb), xii) chromium oxide ($Cr_2O_3$), xiii) zinc oxide (ZnO), xiv) zinc oxide+tantalum oxide ($ZnO+Ta_2O_5$), xv) zinc oxide+tantalum oxide+indium oxide ($ZnO+Ta_2O_5+In_2O_3$), xvi) tin oxide ($SnO_2$), xvii) tin oxide+antimony oxide ($SnO_2+Sb_2O_3$), xviii) tin oxide+tantalum oxide ($SnO_2+Ta_2O_5$), and xix) tin oxide+niobium oxide ($SnO_2+Nb_2O_5$). The use of any of these arrangements makes the characteristics of the embodiment of the present invention more conspicuous.

Also, when one of the interface layers positioned on the two sides of the recording layer contains at least one material selected from the group consisting of i) germanium nitride, ii) germanium nitride chromium, iii) zirconium oxide, iv) stabilized zirconia and chromium oxide, v) stabilized zirconia, silicon oxide, and chromium oxide, vi) zircon and chromium oxide, vii) hafnium oxide, viii) hafnium, oxygen, and nitrogen, ix) zirconium, oxygen, nitrogen, and yttrium, x) zirconium, oxygen, nitrogen, and niobium, and xi) zirconium, oxygen, nitrogen, yttrium, and niobium, and the other contains at least one material selected from the group consisting of xii) chromium oxide, xiii) zinc oxide, xiv) zinc oxide and tantalum oxide, xv) zinc oxide, tantalum oxide, and indium oxide, xvi) tin oxide, xvii) tin oxide and antimony oxide, xviii) tin oxide and tantalum oxide, and xix) tin oxide and niobium oxide, it is possible to further obtain an effect of higher density, higher speed recording, rewrite, and erase than before by mark shrinkage in recrystallization when forming amorphous marks and improvement of the recrystallization promoting function, i.e., an increase in recrystallization rate.

Note that Hf and Ti in the same group as Zr and Zr and Ti in the same group as Hf are known as elements difficult to separate from each other and unavoidably mixed during the process of purifying Zr and in the process of purifying Hf, respectively. Even if these unavoidable elements are slightly mixed, the effects of the embodiment of the present invention do not significantly deteriorate.

(Recording Film)

The effects of the interface film of the present invention are notable when the recording film is made of GeSbTe and its composition exists on a so called pseudobinary system line, or tie-line which can be represented by (GeTe)—($Sb_2Te_3$) and a similar composition. More preferably, the effects of the interface film of the present invention are particularly notable when the recording film is made of an alloy recording film material which has the composition (GeTe)—($Sb_2Te_3$) described above and a similar composition and in which the composition ratio of Ge is 30 at. % or more. Although only the composition of the recording film is conventionally regarded as important, the electron state of the recording film is important as well as the composition in the present invention. The composition will be explained below.

The effects of the present invention are further remarkable when Ge of as the composition GeSbTe described above is partially substituted with Sn, or Sb of GeSbTe is partially substituted with Bi and/or In, and the interface film described earlier is used. In this case, the substitution ratio of Sn to Ge is preferably Sn/Ge<0.5, and the substitution ratio of Bi to Sb is preferably Bi/(Bi+Sb)<0.7. The ratio of In to the amount of Sb or Bi is preferably 0.7 or less, more preferably, 0.5 or less, and most preferably, 0.25 or less. The amounts of these substituent elements have close relations not only to the crystallization promoting function but also to the crystallization temperature and melting point. Therefore, selection from the above ranges was favorable, although optimum conditions change in accordance with design of the medium.

Also, the effects of the interface film of the present invention are noticeable when the recording film is made of GeBiTe and its composition exists on a so called pseudobinary system line, or tie-line which can be represented by (GeTe)—($Bi_2Te_3$) and a similar composition. More preferably, the effects of the interface film of the present invention are particularly noticeable when the recording film is made of an alloy recording film material which has the composition (GeTe)—(Bi2Te3) described above and a similar composition and in which the composition ratio of Ge is 30 at. % or more.

(Nitriding of Each Recording Film)

When the recording film contains nitrogen (N), the film can be represented by (GeTe)—($Sb_2Te_3$) N, i.e., a composition obtained by adding nitrogen (N) to (GeTe)—($Sb_2Te_3$). That is, this composition is obtained by adding nitrogen (N) to the pseudobinary system (GeTe)—($Sb_2Te_3$). More simply, the arrangement can be represented by GeSbTe N. The effects of the interface film of the present invention are remarkable when this nitrided recording film is used. More preferably, the effects of the interface film of the present invention are particularly remarkable when the film is used for an alloy recording film material which has the composition (GeTe)—($Sb_2Te_3$) described above and a similar composition and in which the composition ratio of Ge is 30 at. % or more.

The effects of the present invention are further notable when Ge of the composition GeSbTe N described above is partially substituted with Sn, or Sb of GeSbTe N is partially substituted with Bi and/or In, and the interface film described earlier is used. In this case, the substitution ratio of Sn to Ge is preferably Sn/Ge<0.5, and the substitution ratio of Bi to Sb is preferably Bi/(Bi+Sb)<0.7. The ratio of In to the amount of Bi is preferably 0.7 or less, more preferably, 0.5 or less, and most preferably, 0.25 or less. The amounts of these substituent elements have close relations not only to the crystallization promoting function but also to the crystallization temperature and melting point. Therefore, selection from the above ranges was favorable, although optimum conditions change in accordance with design of the medium.

Also, the effects of the interface film of the present invention are notable when the recording film has a composition obtained by adding nitrogen (N) to (GeTe)—($Bi_2Te_3$), i.e., has a composition on a so called pseudobinary system line, or tie-line represented by (GeTe)—($Bi_2Te_3$) N and a similar composition (which is more simply represented by GeBiTe N). More preferably, the effects of the interface film of the present invention are particularly notable when the recording film is made of an alloy recording film material which has the composition (GeTe)—($Bi_2Te_3$) described above and a similar composition and in which the composition ratio of Ge is 30 at. % or more.

Furthermore, although the effects of the present invention appear regardless of the film thickness of the recording film, the effects are more noticeable when the film thickness of the recording film is 20 nm or less, preferably, 10 nm or less.

In addition, the effects of the present invention are remarkable when the present invention is applied to a recording film in a layer close to the light incident side in a recording medium (single side dual-layer type recording medium) which allows access to two different information layers by light entering from one surface. The characteristic feature in this case is that the film thickness of the recording film can be decreased to 10 nm or less. The use of the interface layer according to the embodiment of the present invention improves the characteristics that the transmittance to a short wavelength laser beam increases and the contrast increases.

The present inventors conducted experiments by using materials such as germanium nitride (GeN), silicon carbide (SiC), silicon nitride (Si—N), and $Ta_2O_5$+SiC already known as interface film materials having the effect of promoting crystallization of the recording film. Consequently, the present inventors have found the tradeoff that the CNR decreases when a material having a high crystallization promoting effect is used without controlling the state of the recording film, and a material having a high CNR has a poor crystallization promoting effect. Also, any of these materials except for Si—N has a relatively large absorption (i.e., a large optical attenuation coefficient) at wavelength $\lambda$=405 nm of a blue violet laser diode to be used in the next generation DVD, thereby causing an optical loss. If this optical loss exists, the power of a laser to be emitted must be increased accordingly. The optical loss also makes the transmittance of the L0 recording film difficult to increase, and decreases both the sensitivity and contrast of the L1 recording film. That is, many problems arise for the two layered medium.

Unfortunately, when the conventional uniform recording film layer and the interface layer material having the crystallization promoting function such as GeN were used, recrystallization intensely occurred especially at low linear velocities, so no high quality amorphous marks could be formed. This made it impossible to decrease the bit pitch and increase the density.

EXAMPLE 1

First, two optical recording media having the same arrangement as shown in FIG. 2 were formed. A recording film was in a crystalline state in one optical recording medium and in an amorphous state in the other. The DOS of the valence band of each recording film was measured using HX PES.

An interference film (ZnS+$SiO_2$), an interface film, the recording film, an interface film, and an interference film (ZnS+$SiO_2$) were formed by the manufacturing steps shown in FIG. 4 by using the sputtering apparatus shown in FIG. 3. Sputtering was performed by placing a polycarbonate (PC) substrate in a vacuum chamber having a vacuum degree of $2\times10^{-3}$ Pa or less, and keeping the substrate temperature at room temperature in an Ar ambient at a gas pressure of 0.1 to 2 Pa. Sputtering was performed in a gas mixture of Ar and $O_2$ or a gas mixture of Ar and $N_2$.

The following systems were used as the recording film and interface layers.

Recording Film Systems Used in Experiments:

GeSbTe, GeSnSbTe, GeSnSbTeIn, GeSbTeIn, GeSbTeBiIn, GeSbSnTeBiIn, GeSbTeBi, GeSnSbTeBi, GeSnSbTeBiIn, GeBiTeIn, GeBiTe, GeSbTe N, GeSbTeBi N, GeBiTe N, GeSbInTe N, GeSbTeBiIn N, and GeBiInTe N.

Interface Layer Systems Used in Experiments:

Germanium nitride (GeN), germanium nitride chromium (GeCrN), zirconium oxide ($ZrO_2$), stabilized zirconia+chromium oxide ($ZrO_2$+$Cr_2O_3$), stabilized zirconia+silicon oxide+chromium oxide ($ZrO_2$+$SiO_2$+$Cr_2O_3$), zircon+chromium oxide ($ZrSiO_4$+$Cr_2O_3$), hafnium oxide ($HfO_2$), a compound ($HfO_{(2-x)}N_x$ wherein $0.1 \leq x \leq 0.2$) containing hafnium (Hf), oxygen (O), and nitrogen (N), a film (($ZrO_{(2-x)}N_x)_{(1-y)}$ (($Y_2O_3)_{(1-z)}(Nb_2O_5)_z)_y$, wherein $0<x\leq0.2$, $0<y\leq0.1$, and $0\leq z\leq1$) containing zirconium (Zr), oxygen (O), nitrogen (N), yttrium (Y), and niobium (Nb), chromium oxide ($Cr_2O_3$), zinc oxide (ZnO), zinc oxide+tantalum oxide (ZnO+$Ta_2O_5$), zinc oxide+tantalum oxide+indium oxide (ZnO+$Ta_2O_5$+$In_2O_3$), tin oxide ($SnO_2$), tin oxide+antimony oxide ($SnO_2$+$Sb_2O_3$), tin oxide+tantalum oxide ($SnO_2$+$Ta_2O_5$), and tin oxide+niobium oxide ($SnO_2$+$Nb_2O_5$).

As an example of the above experiments, FIG. 10 shows the results of measurements of the ratio of the DOS of a crystalline state to the DOS of an amorphous state at an energy level lower by 0.5 (eV) than that at the top of the DOS of the valence band of the recording film, for optical recording media formed to have the same arrangement as shown in FIG. 2 by selectively using the materials combined as shown in FIG. 10 from the interface layer materials shown in FIG. 6 and the recording film materials having the compositions shown in FIG. 8. The various composition ratios shown in FIG. 7 were applied to GexN1 x, and FIG. 10 shows results obtained by using a target containing 100 at % of Ge. Film formation was performed in a gas mixture of Ar and N2, but can be performed by sputtering using a GeN target or Ge+GeN target in only Ar or a gas mixture of Ar and N2. Also, when one interface layer material was applied to one interface layer, another interface layer material was applied to the other interface layer.

COMPARATIVE EXAMPLES 1-3

As comparative examples, optical recording media having the same arrangement as shown in FIG. 2 were similarly formed by applying interface layer materials combined as shown in FIG. 11, and the ratio of the DOS of a crystalline state to the DOS of an amorphous state at an energy level lower by 0.5 (eV) than that at the top of the DOS of the valence band of the recording film was measured in the same manner as above.

Consequently, when any of the interface layers having the combinations shown in FIG. 10 was used, the ratio of the DOS of a crystalline state to the DOS of an amorphous state at an energy level lower by 0.5 (eV) than that at the top of the DOS of the valence band of the recording film was 1.0 (inclusive) to 2.5 (inclusive). However, as indicated by the comparative examples, when the two interface layers were made of the same material and when no interface layer was formed, the ratio was 4 or more, resulting in the disadvantage in high density recording that the crystallization promoting function is insufficient, the crystallization speed is low, or marks shrink at the time of recrystallization when forming the marks.

EXAMPLE 2

Substrates corresponding to both a land and groove recording method (a) and groove recording method (b) were used. In the land and groove recording method (a), a 0.59 mm thick polycarbonate (PC) substrate formed by injection molding was used. Since grooves were formed at a groove pitch of 0.68 µm, the track pitch was 0.34 µm when data was recorded on both a land (L) and groove (G). In the groove recording method (b), an identical 0.59 mm thick PC substrate formed by injection molding was used, but the groove pitch was 0.4 µm.

A sputtering apparatus was used to form, e.g., the following layers on the groove formation surface of each of these PC substrates, thereby forming an optical recording medium as shown in FIG. 1. First, in an L0 information layer 19 formed close to the light incident side, an interference film (ZnS+SiO$_2$) 15a, interface layer 14a, recording film layer 13a, interface layer 12a, interference film (ZnS+Si SiO$_2$O$_2$) 11a, reflecting film 16a, and interference film 17a were sequentially formed. On the other hand, in an L1 information layer 20 formed far from the light incident side, a reflecting film (Ag alloy) 16b, interference film (ZnS+SiO$_2$) 15b, interface layer 14b, recording film layer 13b, interface layer 12b, and interference film (ZnS+SiO2) 11b were sequentially formed on the PC substrate. This example used a GeSbTeBi based recording film as the recording film, ZrO$_2$ as the interface layer on the light incident side, and Cr$_2$O$_3$ as the interface layer on the reflecting film side. The ZnS+SiO$_2$ film (interference film) was formed using a target obtained by mixing SiO$_2$ in ZnS.

After each medium was formed, the reflectance and transmittance of the medium were measured with a spectrophotometer.

The sputtering apparatus used was a so called single wafer sputtering apparatus which forms individual layers in different film formation chambers by sputtering. The single wafer sputtering apparatus comprises, e.g., a load lock chamber for loading a substrate, a transfer chamber, and a process chamber for forming each film. FIG. 3 shows an example of the arrangement of the process chamber. The process chamber comprises a device for evacuating the chamber, a vacuum gauge, a pressure sensor, a film thickness meter, a sputtering target as a film formation material, and a loaded substrate. A dilute gas such as Ar is mainly used as a sputtering gas, and oxygen or nitrogen gas is also used where necessary. An RF power supply, DC power supply, or the like is used for discharge during sputtering in accordance with, e.g., the film formation material or the required film quality. The process flow of film formation is as shown in FIG. 4.

In this example, sputtering was performed by keeping the substrate temperature at room temperature in an Ar ambient, a gas mixture of Ar and O2 or a gas mixture of Ar and N2 at a gas pressure of 0.1 to 2 Pa. Discharge was performed depending on the target at 100 to 3,000 W from a DC or RD power supply. In the L0 information layer 19, the interference film (ZnS+SiO$_2$) 15a, interface layer 14a, recording film layer 13a, interface layer 12a, and interference film (ZnS+SiO$_2$) 11a were sequentially formed. In the L1 information layer 20, the reflecting film (Ag alloy) 16b, interference film (ZnS+SiO2) 15b, interface layer 14b, recording film layer 13b, interface layer 12b, and interference film (ZnS+SiO$_2$) were sequentially formed on the PC substrate. Note that another apparatus may be used depending on sputtering condition, and the present invention is not limited to the above conditions.

FIG. 21 is a GeSbTe tertiary phase diagram for explaining an example of composition range of the recording film of the optical recording medium according to the embodiment of the present invention. The recording film layers 13a and 13b were made of Ge, Sb, and Te. When the composition was represented by Ge$_x$Sb$_y$Te$_z$ wherein x+y+z=100, it was selected from a composition surrounded by x=55·z=45, x=45·z=55, x=10·y=28·z=42, and x=10·y=36·z=54 on the GeSbTe tertiary phase diagram.

FIG. 22 is a GeBiTe tertiary phase diagram for explaining an example of composition range of the recording film of the optical recording medium according to the embodiment of the present invention. The recording film layers 13a and 13b were made of Ge, Bi, and Te. When the composition was represented by Ge$_x$Bi$_y$Te$_z$ wherein x+y+z=100, it was selected from a composition surrounded by x=55·z=45, x=45·z=55, x=10·y=28·z=42, and x=10·y=36·z=54 on the GeSbTe tertiary phase diagram. Although the present inventors examined many compositions, FIG. 22 shows one example.

FIG. 23 is a Ge/Sn Sb/Bi Te tertiary phase diagram for explaining an example of the composition range of an optical recording medium recording layer according to an embodiment of the present invention. For example, Ge and/or Sb shown in FIG. 21 was substituted with Sn and/or Bi. Note that the film thickness of the recording film was 10 nm or less.

ZrO$_2$ was used as the interface layer on the light incident side, and Cr$_2$O$_3$ was used as the interface layer on the reflecting film side. The ZnS+SiO$_2$ film was formed using a target obtained by mixing SiO$_2$ in ZnS. The sputtering apparatus used was a so called cluster type sputtering apparatus which forms individual layers in different film formation chambers by sputtering. After each medium was formed, the reflectance and transmittance of the medium were measured with a spectrophotometer.

FIG. 12 is a view showing examples of evaluation conditions when evaluating the recording film by the land and groove recording method. The recording film on the entire medium surface of each layer was crystallized by an initialization apparatus (not shown). After the initialization, an interlayer separation layer was formed by adhesion using UV resin such that the film formation surface was inside. The thickness of the interlayer separation layer was 25 μm. Evaluation was performed using the ODU 1000 disc evaluation system manufactured by PULSTEC. This system includes a blue violet semiconductor laser diode having a wavelength of 405 nm, and an objective lens with NA=0.65. Recording experiments were conducted by the land and groove recording method. FIG. 12 shows the standard experiment conditions.

The experiments for evaluating the disk characteristics were roughly classified into the following three ways.

(1) Measurement of Bit Error Rate (SbER: Simulated bit (Error Rate)

One was the measurement of the bit error rate (SbER: Simulated bit Error Rate) for measuring the data error rate. The other was the analog measurement for evaluating the readout signal quality. In the SbER measurement, a mark sequence randomly including patterns from 2 T to 13 T was first overwritten 10 times. Then, the same random patterns were overwritten 10 times on two adjacent tracks of the track of interest. After that, the SbER of the middle track was measured.

(2) Analog Measurement

The analog measurement was performed as follows. First, a mark sequence randomly including patterns from 2 T to 13 T was similarly overwritten 10 times. Then, a single pattern of 9 T was overwritten on the mark sequence once, and the carrier to noise ratio (to be referred to as the CNR hereinafter) of the signal frequency of the 9 T mark was measured using a spectrum analyzer. Subsequently, a laser beam at the erase power level was emitted while the disk was rotated once, thereby erasing the recording marks. The reduction in signal intensity of the 9 T mark was measured as the erase ratio (ER). After that, the head was moved to a well separated track to measure the cross erase (E X).

(3) Overwrite (OW) Test

An overwrite (OW) characteristic experiment was conducted as the third measurement. In this experiment, the CNR was measured while a random signal was overwritten (OW) on the same track. Evaluation was performed in accordance with whether the CNR reduced by 2 dB or more from the initial value 2,000 times or more. That is, this experiment was not conducted to check a maximum OW count. A necessary OW count is about 1,000 for video recording, and 10,000 or more for PC data recording. Since, however, the market of video recording is overwhelmingly large, the evaluation was performed by attaching importance to video recording.

Note that in addition to these measurements shown in FIG. 12, evaluation was also performed by decreasing the linear velocity (v=4.4 m/s, this further increased the capacity by 10% or more), further decreasing the bit pitch, and further increasing the density. An experiment indicating that a higher density was possible was also conducted. In this experiment, the characteristics improved much better than the conventional characteristics. These results are also shown. Furthermore, no problem arose in environmental tests.

Note that the optimum power of the SBER measurement described above was defined as the sensitivity of the medium. To measure the sensitivity and transmittance of L0, a medium obtained by adhering L0 having the arrangement of this example and a blank disk having no films and a medium obtained by adhering L1 and a blank disk having no films were additionally prepared. Each evaluation was performed at a linear velocity of 5.4 m/s (constant velocity) in the land and groove recording method (a), and at a linear velocity of 6.61 m/s (constant velocity) in the groove recording method (b), unless otherwise specified.

All the examples explained below used the same conditions as above. The following example to be explained as a representative example indicates the worst data from the above mentioned evaluation results. For example, the recording density of the land and groove recording method (a) is higher than that of the groove recording method (b), so the characteristics of the method (b) are better than those of the method (a) as a whole. This tendency is particularly noticeable for the SbER rather than the CNR or ER. In a certain example, the SbER was about $1/10$ to $1/100$ or almost no error occurred in the method (b), compared to the method (a), for the same configuration.

FIG. 13 is a view showing the evaluation results (the CNR, SbER, and ER) of the recording films of a plurality of samples. FIG. 13 shows the evaluation results except for the results of the OW count. The SbER was $1.8 \times 10^{-6}$ or less for both the land and groove, and the OW count was 2,000 or more, i.e., a practical characteristic was obtained. When the OW characteristic of this example alone was evaluated by performing OW 10,000 times or more for reference, OW of about 10,000 times was possible. Then, analog data comparison was performed. In this medium, the CNR was 52.9 dB or more for both the land and groove, the erase ratio was 33.8 dB or less, and the cross erase was 0.1 dB or less, i.e., the results were excellent.

A disk was formed by forming the film configuration of this example on a 1.1 mm thick polycarbonate (PC) substrate formed by injection molding, and forming a 75 μm thick transparent cover layer on the substrate. The recording/erase characteristics of the medium were evaluated with an evaluation system including a blue violet semiconductor layer having a wavelength of 405 nm and an objective lens with NA=0.85. The groove pitch of the substrate was 0.32 μm, and the evaluation was done by groove recording. That is, the groove recording method (b) described above was used. The results were very good, i.e., the CNR was 52 dB or more, the erase ratio was 30 dB or less, and the OW count was 2,000 or more. Accordingly, the interface layer material of this invention example is presumably favorable regardless of the thickness of the substrate and the thickness of the cover layer on the light incident side.

FIG. 14 is a view showing other evaluation results (the ER when the linear velocity was changed) of the recording films of a plurality of samples. In Examples 2 to 9, the erase ratio was also measured by changing the linear velocity. FIG. 14 shows the results. Each sample shows good erase characteristics.

When a medium manufactured following the same procedures as for the above evaluation media was analyzed using the XPS method, the medium had segregation or a concentration distribution as shown in FIG. 5A, 5B, or 5C. Note Auger spectroscopy, SIMS, HX PES, or the like may be used in place of the XPS method. That is, Ge, Sb, and Bi were rich and Te was poor near the interface on one side, e.g., on the left side in FIG. 5A. FIG. 5A shows only the elements Ge and Te for the sake of simplicity.

COMPARATIVE EXAMPLES 4-6

Comparative examples will be explained below. Disks using $SiO_2$ and $Y_2O_3$ as interface layers and a disk having no interface layer were formed following the same procedures as in Example 2 except that the combinations of interface layer materials of Comparative Examples 1 to 3 shown in FIG. 11 were applied. The same experiments as in Example 2 were conducted on the obtained disks. FIGS. 17 and 18 show the results.

FIG. 17 is a view showing the evaluation results (the CNR, SbER, and ER) of Comparative Example 1 having no interface layer, Comparative Example 2 using $SiO_2$ as an interface layer, and Comparative Example 3 using $Y_2O_3$ as an interface layer. FIG. 18 shows other evaluation results (the ER when the linear velocity was changed) of Comparative Examples 2 and 3 respectively using $SiO_2$ and $Y_2O_3$ as interface layers. As shown in FIGS. 17 and 18, one of the CNR, SbER, and erase ratio was unsatisfactory. Accordingly, no OW characteristic was evaluated.

EXAMPLE 3

A disk having the same arrangement as in Example 2 was formed by using GeCrN as the interface layer on the light incident side and $Cr_2O_3$ as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 52 dB or more for both the land and groove. Likewise, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 4

A disk having the same arrangement as in Example 2 was formed by using $ZrO_2+Y_2O_3+Cr_2O_3$ as the interface layer on the light incident side and $SnO_2+Sb_2O_3$ as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 52 dB or more for both the land and groove. Similarly, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 5

A disk having the same arrangement as in Example 2 was formed by using $ZrSiO4+Cr_2O_3$ as the interface layer on the light incident side and $Cr_2O_3$ as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 53 dB or more for both the land and groove. Similarly, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 6

A disk having the same arrangement as in Example 2 was formed by using $ZrO_2+Y_2O_3+SiO_2+Cr_2O_3$ as the interface layer on the light incident side and $ZnO+Ta_2O_5+In_2O_3$ as the interface layer on the reflecting film side, and the same experiments as in Example 2 were conducted. Consequently, as shown in FIG. 13, the SbER of each sample was on the order of $10^{-6}$ or both the land and groove, i.e., a favorable error rate was obtained. The CNR as analog data of each sample was also as high as 53 dB or more for both the land and groove. Likewise, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 7

A disk having the same arrangement as in Example 2 was formed by using $(ZrO_{(2-x)}N_x)_{(1-y)}((Y_2O_3)_{(1-z)}(Nb_2O_5)_z)_y$ ((x, y, z)=(0.05, 0.05, 0)) as the interface layer on the light incident side and $SnO_2+Nb_2O_5$ as the interface layer on the reflecting film side, and the same experiments as in Example 2 were conducted. Consequently, as shown in FIG. 13, the SBER of each sample was on the order of $10^{-6}$ for both the land and groove, i.e., a favorable error rate was obtained. The CNR as analog data of each sample was also as high as 53 dB or more for both the land and groove. Analogously, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 8

A disk having the same arrangement as in Example 2 was formed by using $HfO_{(2-x)}N_x$ (x=0.1) as the interface layer on the light incident side and GeN as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 52 dB or more for both the land and groove. Similarly, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 9

A disk having the same arrangement as in Example 2 was formed by using GeN as the interface layer on the light incident side and $Cr_2O_3$ as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 53 dB or more for both the land and groove. Likewise, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 10

A disk having the same arrangement as in Example 2 was formed by using $HfO_{(2-x)}N_x$ (x=0.1) as the interface layer on the light incident side and $ZrSiO_4+Cr_2O_3$ as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 53 dB or more for both the land and groove. Likewise, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 11

A disk having the same arrangement as in Example 2 was formed by using $Cr_2O_3$ as the interface layer on the light incident side and $ZnO+Ta_2O_5$ as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 51 dB or more for both the land and groove. Analogously, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 12

A disk having the same arrangement as in Example 2 was formed by using GeN as the interface layer on the light incident side and $SnO_2+Ta_2O_5$ as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 53 dB or more for both the land and groove. Similarly, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 13

A disk having the same arrangement as in Example 2 was formed by using $ZrO_2+Y_2O_3+Cr_2O_3$ as the interface layer on the light incident side and $ZnO+Ta_2O_5+In_2O_3$ as the interface layer on the reflecting film side, and the same experiments as in Example 2 were conducted. Consequently, as shown in FIG. 13, the SbER of each sample was on the order of $10^{-6}$ for both the land and groove, i.e., a favorable error rate was obtained. The CNR as analog data of each sample was also as high as 53 dB or more for both the land and groove. Likewise, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 14

Substrates corresponding to both the land and groove recording method (a) and groove recording method (b) described earlier were used. In the land and groove recording method (a), a 0.6 mm thick polycarbonate (PC) substrate formed by injection molding was used. Since grooves were formed at a groove pitch of 0.68 µm, the track pitch was 0.34 µm when data was recorded on both a land (L) and groove (G). In the groove recording method (b), a 0.59 mm thick PC substrate formed by injection molding was used, and the groove pitch was 0.4 µm.

A sputtering apparatus was used to sequentially form $ZnS+SiO_2$, $SiO_2$, $ZnS+SiO_2$, an interface layer, a recording film layer, an interface layer, $ZnS+SiO_2$, and an Ag alloy from the light incident side on the groove formation surface of each of these PC substrates. Then, UV curing resin was used to adhere a so called blank disk having no films formed on it. The sputtering apparatus used in the same manner as in Example 2 was a so called single wafer sputtering apparatus which forms individual layers in different film formation chambers by sputtering.

The recording film layer was made of Ge, Sb, and Te. When the composition was represented by $Ge_xSb_yTe_z$ wherein x+y+z=100, it was selected from a composition surrounded by x=55·z=45, x=45·z=55, x=10·y=28·z=42, and x=10·y=36·z=54 on a GeSbTe tertiary phase diagram. Also, the recording film layer was made of Ge, Sb, Te, and Bi or Sn, and the composition of GeSbTe was partially substituted with Bi and/or In and/or Sn When the substituted composition was represented by $(Ge_{(1-w)}Sn_w)_x(Sb_v(Bi_{(1-u)}In_u)_{(1-v)})_yTe_z$ wherein x+y+z=100, it was selected from GeSnSbTe, GeSnSbTeIn, GeSbTeIn, GeSbTeBiIn, GeSbSnTeBiIn, GeSbTeBi, GeBiTeIn, GeSnSbTeBi, and GeSnSbTeBiIn in which w, v, and u satisfied $0 \leq w < 0.5$, $0 \leq v < 0.7$, and $0 \leq u \leq 1.0$. In addition, the recording film layer was made of Ge, Bi, and Te. When the composition was represented by $Ge_xBi_yTe_z$ wherein x+y+z=100, it was selected from a composition surrounded by x=55·z=45, x=45·z=55, x=10·y=28·z=42, and x=10·y=36·z=54 on a GeBiTe tertiary phase diagram.

Although the present inventors examined many compositions, this example shows a case using a GeSbTeBi based recording film. Note that the film thickness of the recording film was 10 nm or less.

GeN was used as the interface layer on the light incident side, and $Cr_2O_3$ was used as the interface layer on the reflecting film side. The $ZnS+SiO_2$ film was formed using a target obtained by mixing $SiO_2$ in ZnS. The sputtering apparatus used was a so called single wafer sputtering apparatus which forms individual layers in different film formation chambers by sputtering. After each medium was formed, the reflectance and transmittance of the medium were measured with a spectrophotometer.

The recording film on the entire medium surface of each layer was crystallized by an initialization apparatus (not shown). After the initialization, an interlayer separation layer was formed by adhesion using UV resin such that the film formation surface was inside. The thickness of the interlayer separation layer was 20 µm. Evaluation was performed using the ODU 1000 disc evaluation system described previously. This system includes a blue violet semiconductor laser having a wavelength of 405 nm, and an objective lens with NA=0.65. Recording experiments were conducted by the land and groove recording method following the same procedures as in Example 2. Consequently, as shown in FIG. 13, the SbER of each sample was on the order of $10^{-6}$ for both the land and groove, i.e., a favorable error rate was obtained. The CNR as analog data of each sample was also as high as 53 dB or more for both the land and groove. Likewise, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film. Also, very thin germanium oxide and antimony oxide 0.1 to 0.6 nm thick were found in the interface of the layer in contact with the recording film.

EXAMPLE 15

Substrates corresponding to both the land and groove recording method (a) and groove recording method (b) described earlier were used. In the land and groove recording method (a), a 0.6 mm thick polycarbonate (PC) substrate formed by injection molding was used. Since grooves were formed at a groove pitch of 0.68 μm, the track pitch was 0.34 μm when data was recorded on both a land (L) and groove (G). In the groove recording method (b), a 0.59 mm thick PC substrate formed by injection molding was used, and the groove pitch was 0.4 μm. A sputtering apparatus was used to sequentially form $ZnS+SiO_2$, SiOC, $ZnS+SiO_2$, an interface layer, a recording film layer, an interface layer, $ZnS+SiO_2$, and an Ag alloy from the light incident side on the groove formation surface of each of these PC substrates. Then, UV curing resin was used to adhere a so called blank disk having no films formed on it. The SiOC film was obtained by reactive ion etching using an SiC based target and a gas mixture of $Ar/O^2$, and had a low refractive index similar to that of $SiO_2$. Experiments were conducted following the same procedures as in Example 2. Consequently, as shown in FIG. 13, the SbER of each sample was on the order of $10^{-6}$ for both the land and groove, i.e., a favorable error rate was obtained. The CNR as analog data of each sample was also as high as 51 dB or more for both the land and groove. Analogously, the OW count of each medium was 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film.

EXAMPLE 16

Selection of Range of Best Composition of Recording Film

Disks having the same arrangement as in Example 2 were formed by using GeN as the interface layer on the light incident side and $Cr_2O_3$ as the interface layer on the reflecting film side, or GeN on the two sides. The recording film layer was made of Ge, Sb, and Te. When the composition was represented by $Ge_xSb_yTe_z$ wherein x+y+z=100, it was selected from a composition surrounded by x=55·z=45, x=45·z=55, x=10·y=28·z=42, and x=10·y=36·z=54 on a GeSbTe tertiary phase diagram. Also, the recording film layer was made of Ge, Sb, Te, and Bi or Sn, and the composition of GeSbTe was partially substituted with Bi and/or In and/or Sn. When the substituted composition was represented by $(Ge_{(1-w)}Sn_w)_x(Sb_v(Bi_{(1-u)}In_u)_{(1-v)})_yTe_z$ wherein x+y+z=100, it was selected from GeSbTeBi, GeSbTeSn, GeSbTeBiSn, GeSnSbTeIn, GeSbTeIn, GeSbTeBiIn, GeSbSnTeBiIn, GeBiTeIn, and GeSnSbTeBiIn which satisfied 0≦w<0.5, 0≦v<0.7, and 0≦u≦1.0. In addition, the recording film layer was made of Ge, Bi, and Te. When the composition was represented by $Ge_xBi_yTe_z$ wherein x+y+z=100, it was selected from a composition surrounded by x=55·z=45, x=45·z=55, x=10·y=28·z=42, and x=10·y=36·z=54 on a GeBiTe tertiary phase diagram. Although the present inventors examined many compositions, this example shows disks using the GeSbTe, GeSbTeSn, and GeBiTe based recording films whose representative examples are shown in FIG. 8. Experiments were conducted following the same procedures as in Example 2. FIG. 15 shows the results.

FIG. 15 is a view showing the evaluation results (the CNR and SbER) of the recording films having various compositions. As shown in FIG. 15, both the CNR and SbER showed good characteristics. The OW count was also 2,000 or more, i.e., a practical characteristic was obtained.

When a medium manufactured in the same manner as for the above mentioned evaluation media was analyzed by the XPS method, Ge, Sb, and Bi were rich and Te was poor near the interface of the recording film. Also, very thin germanium oxide, antimony oxide, and bismuth oxide 0.1 to 0.4 nm thick were found in the interface of the layer in contact with the recording film.

EXAMPLE 17

(Selection of Range of Best Composition of Recording Film) $N_2$ Addition

Disks having the same arrangement as in Example 2 were formed by using GeCrN as the interface layer on the light incident side, and $Cr_2O_3$ as the interface layer on the reflecting film side. The recording film layer was made of Ge, Sb, Te, and N (nitrogen). When the composition of a compound made of Ge, Sb, and Te was represented by $Ge_xSb_yTe_z$ wherein x+y+z=100, it was selected from materials obtained by adding 1 to 5 at. % of N (nitrogen) to GeSbTe based compounds in a composition region surrounded by x=55·z=45, x=45·z=55, x=10·y=28·z=42, and x=10·y=36·z=54 on a GeSbTe tertiary phase diagram. Also, the recording film layer was made of Ge, Sb, Te, Bi and/or In and/or Sn, and N (nitrogen), and the composition of GeSbTe was partially substituted with Bi and/or Sn. When the substituted composition was represented by $(Ge_{(1-w)}Sn_w)_x(Sb_v(Bi_{(1-u)}In_u)_{(1-v)})_yTe_z$ wherein x+y+z=100, it was selected from materials obtained by adding 0.1 to 10 at. % of N (nitrogen) to GeSbTeBi, GeSbTeSn, GeSbTeBiSn, GeSnSbTeIn, GeSbTeIn, GeSbTeBiIn, GeSbSnTeBiIn, GeBiTeIn, and GeSnSbTeBiIn which satisfied 0≦w<0.5, 0≦v<0.7, and 0≦u≦1.0. In addition, the recording film layer was made of Ge, Bi, and Te. When the composition was represented by $Ge_xBi_yTe_z$ wherein x+y+z=100, it was selected from a composition surrounded by x=55·z=45, x=45·z=55, x=10·y=28·z=42, and x=10·y=36·z=54 on a GeBiTe tertiary phase diagram. Furthermore, the recording film layer was made of Ge, Sb, Te, and N (nitrogen). When the composition of a compound made of Ge, Sb, and Te was represented by $Ge_xSb_yTe_z$ wherein x+y+z, it was selected from materials obtained by adding 0.1 to 10 at. % of N (nitrogen) to GeSbTe based compounds in a composition region surrounded by x=55·z=45, x=45·z=55, x=10·y=28·z=42, and x=10·y=36·z=54 on a GeSbTe tertiary phase diagram.

Although the present inventors examined many compositions, this example used materials obtained by adding 1 to 5 at. % of N (nitrogen) to the representative examples shown in FIG. 9. This example shows disks using recording films formed by adding N (nitrogen) to GeSbTe, GeSbTeSn, and GeBiTe. Evaluation was performed by conducting the same experiments as in Example 2 at a double linear velocity, i.e., a linear velocity of 10.8 [m/sec]. FIG. 16 shows the results.

FIG. 16 is a view showing the evaluation results (the CNR and SbER) when small amounts of N were added to the recording films having various compositions. As shown in FIG. 16, both the CNR and SbER showed good characteristics. The OW count was also 2,000 or more, i.e., a practical characteristic was obtained, and no film peeling was found after the environmental test. The amount of N (nitrogen) was preferably 1 to 5 at. %, and more preferably, 3 at. %.

When a medium manufactured in the same manner as for the above mentioned evaluation media was analyzed by the XPS method, very thin germanium oxide and bismuth oxide 0.1 to 0.9 nm thick were found in the interface of the layer in contact with the recording film.

The essential required condition according to the embodiment of the present invention is that in a phase change optical recording medium which records information by using a recording film which reversibly changes the atomic arrangement, the ratio of the DOS of a crystalline state to the DOS of an amorphous state (the DOS of crystalline state/DOS of amorphous state) at an energy level lower by 0.5 (eV) than that at the top of the DOS of the valence band of the recording film is 1.0 (inclusive) to 2.5 (inclusive). Therefore, the other films and the like are not limited to the materials explained in the examples. The recording film materials can also be changed as long as the effects obtained by practicing the present invention do not deteriorate. That is, slight amounts of, e.g., Co, V, and Ag can be added to GeSbTe or GeBiTe.

Also, the above examples do not limit the substrate thickness and the order of film formation at all. That is, the present invention is similarly applicable to a medium which allows light to enter through a substrate on which films are formed, or a medium which allows light to enter through a transparent sheet adhered on a substrate on which films are formed. For example, it is evident from the above explanation that the present invention achieves its effects for a recording medium which uses an objective lens having a high NA of about 0.85 and in which the transparent sheet thickness on the light incident side is decreased to about 0.1 mm. Furthermore, the wavelength of a laser to be used is not limited to about 405 nm. That is, the optical characteristics of the interface layer material make the layer substantially transparent at a shorter wavelength, i.e., from 350 nm to about 250 nm. Accordingly, the effects are obtained by practicing the present invention within this wavelength range.

As explained above, a phase change optical recording medium which records information by using a recording film which reversibly changes the atomic arrangement comprises a substrate, the recording film capable of reversibly changing the atomic arrangement, a film in contact with the recording film and having a crystallization promoting function, a protective film or dielectric film, and a reflecting film, and elements forming the recording film have segregation or concentration distributions in the thickness direction of the recording film from a portion in contact with the recording film. In this manner, a desired mark width can be obtained without any recrystallization during recording in a high density, high speed recording medium. This makes it possible to ensure a high CNR and low bit error rate, and obtain a high erase ratio and superior cross erase characteristics. As a consequence, it is possible to implement a phase change recording medium capable of recording and rewriting information at a speed and density higher than those of the conventional media.

The material systems and compositions of these recording films can be selected in accordance with the necessary crystallization rate and medium sensitivity, and the optical characteristics of the medium such as the reflectance, contrast, and transmittance.

It is possible by practicing one of the embodiments of the present invention to implement a phase change recording medium which hardly causes cross erase, has a high crystalline/amorphous contrast, has a high erase ratio at a high linear velocity, has superior overwrite (OW) cycle characteristics and a high environmental resistance, or has a high density and large capacity and is capable of high speed overwrite.

Note that the present invention is not limited to the above embodiments and can be variously modified without departing from the spirit and scope of the invention, when practiced presently or in the future on the basis of techniques usable at that time. For example, the information storage medium used in practicing the present invention is not limited to an optical disk obtained by adhering 0.6 mm thick substrates, and may also be an optical disk obtained by forming a 0.1 mm thick protective layer (or transparent sheet) on the surface of a 1.2 mm thick substrate (i.e., can also be an optical disk obtained by adhering a 0.1 mm thick transparent sheet to a 1.1 mm thick substrate having recording layers and the like). The information storage medium may also be an optical disk obtained by forming a 0.1 mm thick transparent protective layer (or transparent sheet) on the surface of one or both of 0.6 mm thick substrates forming the optical disk. Also, the embodiment of the present invention shows a very thin oxide film having an average thickness of 0.1 (inclusive) to 1 (inclusive) nm, but the lower limit may also be less than 0.1 nm as long as necessary numerical control is possible. Furthermore, the upper and lower limits indicating the average thickness of the very thin oxide film can have a certain width defined by one significant digit. More specifically, an average thickness of 0.1 to 1 nm can have a width of ±20% to 30% in mass production. Also, very thin films sometimes have so called island like textures, and hence are scientifically regarded as uneven films in some cases. However, the present invention indicates the film thickness of a film by the average film thickness, so even the island like textures do not spoil the effects of the present invention.

The embodiments can also be appropriately combined as much as possible, and the combined effects are obtained in these cases. Furthermore, the embodiments include inventions in various stages, so various inventions can be extracted by properly combining a plurality of disclosed constituent elements. For example, even when some of all the constituent elements of the embodiments are omitted, arrangements from which these constituent elements are omitted can be extracted as inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical recording medium comprising:
a substrate; and
a multi-layered structure including
an interference film;
a recording film configured to reversibly change an atomic arrangement;
a thin oxide film having an average thickness of 0.1 nm (inclusive) to 1.0 nm (inclusive) of an element made of a constituent element of the recording film formed in the portion in contact with the recording film;
a crystallization promoting film containing oxygen formed on the thin oxide film; and
a reflecting film, wherein
a ratio of a density of state (DOS) in a crystalline state of the recording film to the DOS in an amorphous state of the recording film, at an energy level lower by 0.5 eV than an energy level at the top of the DOS of a valence band of the recording film, is from 1.0 (inclusive) to 2.5 (inclusive).

2. The medium according to claim 1, wherein the multi-layered structure includes a dielectric film which contributes to optical enhancement and/or thermal diffusion.

3. The medium according to claim 1, wherein the interference film functions as a protective film of the recording film.

4. The medium according to claim 1, wherein the recording film comprises an element having one of a segregation distribution and a concentration distribution in a thickness direction of the recording film.

5. The medium according to claim 1, wherein a ratio of a DOS of a crystalline state to a DOS of an amorphous state at an energy level lower by 0.25 to 1.0 (eV) than an energy level at a top of a DOS of a valence band of the recording film is 1.0 (inclusive) to 2.5 (inclusive).

6. The medium according to claim 1, wherein the crystallization promoting film comprises an upper interface film in contact with one surface of the recording film and a lower interface film in contact with the other surface of the recording film, and the upper interface film and the lower interface film are controlled such that crystallization rates are different in the thickness direction of the recording film.

7. The medium according to claim 1, wherein the crystallization promoting film comprises an upper interface film in contact with one surface of the recording film and a lower interface film in contact with the other surface of the recording film, and contains at least one material selected from the group consisting of i) zirconium oxide, ii) stabilized zirconia and chromium oxide, iii) stabilized zirconia, silicon oxide, and chromium oxide, iv) zircon and chromium oxide, v) hafnium oxide, vi) hafnium, oxygen, and nitrogen, vii) zirconium, oxygen, nitrogen, and yttrium, viii) zirconium, oxygen, nitrogen, and niobium, ix) zirconium, oxygen, yttrium, and niobium, x) chromium oxide, xi) zinc oxide, xii) zinc oxide and tantalum oxide, xiii) zinc oxide, tantalum oxide, and indium oxide, xiv) tin oxide, xv) tin oxide and antimony oxide, xvi) tin oxide and tantalum oxide, and xvii) tin oxide and niobium oxide.

8. The medium according to claim 7, wherein
one of the upper interface film and the lower interface film contains at least one material selected from the group consisting of i) zirconium oxide, ii) stabilized zirconia and chromium oxide, iii) stabilized zirconia, silicon oxide, and chromium oxide, iv) zircon and chromium oxide, v) hafnium oxide, vi) hafnium, oxygen, and nitrogen, vii) zirconium, oxygen, nitrogen, and yttrium, viii) zirconium, oxygen, nitrogen, and niobium, and ix) zirconium, oxygen, yttrium, and niobium, and
the other one of the upper interface film and the lower interface film contains at least one material selected from the group consisting of x) chromium oxide, xi) zinc oxide, xii) zinc oxide and tantalum oxide, xiii) zinc oxide, tantalum oxide, and indium oxide, xiv) tin oxide, xv) tin oxide and antimony oxide, xvi) tin oxide and tantalum oxide, and xvii) tin oxide and niobium oxide.

9. The medium according to claim 1, wherein
the recording film contains germanium, antimony, and tellurium, and
when a composition of the recording film is represented by $Ge_xSb_yTe_z$ wherein x+y+z=100, the recording film has a composition within a range defined by $x=55 \cdot z=45$, $x=45 \cdot z=55$, $x=10 \cdot y=28 \cdot z=42$, and $x=10 \cdot y=36 \cdot z=54$ on a GeSbTe tertiary phase diagram.

10. The medium according to claim 9, wherein 1 to 5 at.% of nitrogen is added to the GeSbTe based compound.

11. The medium according to claim 1, wherein
the recording film contains germanium, bismuth, and tellurium, and
when a composition of the recording film is represented by $Ge_xBi_yTe_z$ wherein x+y+z=100, the recording film has a composition within a range defined by $x=55 \cdot z=45$, $x=45 \cdot z=55$, $x=10 \cdot y=28 \cdot z=42$, and $x=10 \cdot y=36 \cdot z=54$ on a GeBiTe tertiary phase diagram.

12. The medium according to claim 11, wherein 1 to 5 at.% of nitrogen is added to the GeBiTe based compound.

13. The medium according to claim 1, wherein when a composition of the recording film is partially substituted with bismuth and/or indium and/or tin and the substituted composition is represented by $(Ge_{(1-w)}Sn_w)_x(Sb_v(Bi_{(1-u)}In_u)_{(1-v)})_yTe_z$ wherein x+y+z=100, w, v, and u in the composition satisfy $0 \leq w < 0.5$, $0 \leq v < 0.7$, and $0 \leq u \leq 1$.

14. The medium according to claim 13, wherein the recording film contains a compound selected from the group consisting of GeSnSbTe, GeSnSbTeIn, GeSbTeIn, GeSbTeBiIn, GeSbSnTeBiIn, GeSbTeBi, GeBiTeIn, GeSnSbTeBi, and GeSnSbTeBiIn, and 1 to 5 at.% of nitrogen added to the compound.

15. An information recording/playback apparatus comprising:
means for recording information on a recording film of an optical recording medium cited in claim 1; and
means for playing back information from the recording film having undergone information recording.

16. An information recording/playback method for recording information on a recording film of an optical recording medium cited in claim 1, and for playing back information from the recording film having undergone information recording.

* * * * *